(12) United States Patent
Takahashi et al.

(10) Patent No.: US 11,768,109 B2
(45) Date of Patent: Sep. 26, 2023

(54) SPECTROSCOPIC MEASURING INSTRUMENT

(71) Applicant: National University Corporation Hokkaido University, Hokkaido (JP)

(72) Inventors: Yukihiro Takahashi, Sapporo (JP); Youhei Moteki, Sapporo (JP); Nobuyasu Naruse, Otsu (JP)

(73) Assignee: NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 0 days.

(21) Appl. No.: 17/684,660

(22) Filed: Mar. 2, 2022

(65) Prior Publication Data
US 2023/0251129 A1 Aug. 10, 2023

(30) Foreign Application Priority Data

Feb. 7, 2022 (JP) ................................. 2022-017171

(51) Int. Cl.
*G01J 3/02* (2006.01)
*G01N 21/25* (2006.01)
*G01J 3/28* (2006.01)

(52) U.S. Cl.
CPC ........... *G01J 3/0229* (2013.01); *G01J 3/2823* (2013.01); *G01N 21/255* (2013.01)

(58) Field of Classification Search
CPC ..... G01J 3/0229; G01J 3/2823; G01N 21/255
See application file for complete search history.

(56) References Cited

U.S. PATENT DOCUMENTS

| 7,166,825 B1 | 1/2007 | Smith et al. |
| 2017/0358106 A1 | 12/2017 | Yoshimura et al. |

(Continued)

FOREIGN PATENT DOCUMENTS

| CN | 102183967 | 9/2011 |
| CN | 112903629 | 6/2021 |

(Continued)

OTHER PUBLICATIONS

Kautz Marie-Luise et al: "Surface irradiance estimations on watercourses with remote sensing data", Proceedings of SPIE; [Proceedings of SPIE; ISSN 0277-786X; vol. 8615], SPIE, 1000 vol. 10790, Oct. 9, 2018 (Oct. 9, 2018) pp. 107900X-107900X, XP060112305, DOI: 10.1117/12.2325373 ISBN: 978-1-5106-2099-5.

(Continued)

*Primary Examiner* — Tarifur R Chowdhury
*Assistant Examiner* — Carlos Perez-Guzman
(74) *Attorney, Agent, or Firm* — Wenderoth, Lind & Ponack, L.L.P.

(57) ABSTRACT

The spectroscopic measuring instrument includes: a spectrometer to make measurement of a reflection spectrum of an object relative to a light source and output measurement information representing a result of the measurement; a shadow projector including obstacle(s) to allow light from the light source to cast shadow(s) on an object surface; an imaging device to output image information representing an image of an imaging area including the object surface; a storage interface removably connectable to a computer readable medium; and a processing device. The processing device is connected to the spectrometer, the imaging device and the storage interface, and performs a measurement process of storing the measurement information from the spectrometer and the image information from the imaging (Continued)

device in the computer readable medium connected to the storage interface.

20 Claims, 16 Drawing Sheets

(56) References Cited

U.S. PATENT DOCUMENTS

| | | |
|---|---|---|
| 2020/0319024 A1 | 10/2020 | Takahashi et al. |
| 2021/0358120 A1 | 11/2021 | Nomura et al. |
| 2021/0377502 A1 | 12/2021 | Sano et al. |

FOREIGN PATENT DOCUMENTS

| | | |
|---|---|---|
| JP | 2002-500754 | 1/2002 |
| JP | 2006-314215 | 11/2006 |
| JP | 2006-317195 | 11/2006 |
| JP | 2007-124932 | 5/2007 |
| JP | 2008-76346 | 4/2008 |
| JP | 2012-159375 | 8/2012 |
| JP | 2012-196167 | 10/2012 |
| JP | 2015-77113 | 4/2015 |
| JP | 2015-223101 | 12/2015 |
| JP | 2016-127806 | 7/2016 |
| JP | 6342594 | 5/2018 |
| JP | 2020003340 A * | 1/2020 ............ G01J 3/027 |
| JP | 2022-7978 | 1/2022 |
| WO | 2015/195746 | 12/2015 |
| WO | 2016/181743 | 11/2016 |
| WO | 2020/075000 | 4/2020 |

OTHER PUBLICATIONS

Extended European Search Report dated Aug. 23, 2022 in corresponding European Patent Application No. 22159560.6.
Notice of Grounds for Rejection dated Aug. 23, 2022 in corresponding Japanese Patent Application No. 2022-017171 with concise explanation.

* cited by examiner

SPECTROSCOPIC MEASURING INSTRUMENT

CROSS REFERENCE TO RELATED APPLICATION(S)

The present application is based upon and claims priority of Japanese Patent Application No. 2022-017171 filed on Feb. 7, 2022, the entire content of which is incorporated herein by reference.

BACKGROUND

1. Technical Field

The present disclosure relates to spectroscopic measuring instruments.

2. Related Art

JP 2006-314215 A, JP 2006-317195 A, JP 2015-077113 A, JP 2015-223101 A, JP 2008-076346 A and JP 2012-196167 A disclose determining kinds of plants, wellness of plants, or growth states of plants, based on spectra of reflections of sunlight by plants.

Regarding outdoor measurement of spectra (e.g., reflection spectra or scattering spectra) of farm produces, soil, rocks, minerals, stones, forests, oceans, and/or atmospheres, spectra vary depending on a positional relationship between a light source and a spectrometer at measuring of those spectra, such as an angle of a view direction of the spectrometer relative to an incident direction of sunlight. To assess those spectra more accuracy, it is desirable to use information on the positional relationship between the light source and the spectrometer at measurement of those spectra. However, the techniques disclosed in JP 2006-314215 A, JP 2006-317195 A, JP 2015-077113 A, JP 2015-223101 A, JP 2008-076346 A and JP 2012-196167 A cannot obtain the information on the positional relationship between the light source and the spectrometer at measurement.

One of objects of the present disclosure is to provide a spectroscopic measuring instrument enabling measurement of a reflection spectrum of an object relative to a light source and identification of a positional relationship between the light source and a spectrometer at the measurement.

SUMMARY

A spectroscopic measuring instrument according to one aspect of the present disclosure includes: a spectrometer configured to make measurement of a reflection spectrum of an object relative to a light source and output measurement information representing a result of the measurement; a shadow projector comprising an object surface to receive light from the light source and one or more obstacles to allow light from the light source to cast one or more shadows on the object surface; an imaging device configured to record an image of an imaging area including the object surface and output image information representing the image of the imaging area; a storage interface removably connectable to a computer readable medium; and a processing device connected to the spectrometer, the imaging device and the storage interface, and configured to perform a measurement process of storing the measurement information from the spectrometer and the image information from the imaging device in the computer readable medium connected to the storage interface.

A spectroscopic measuring instrument according to another aspect of the present disclosure is for providing information to be processed by an information processing system. The spectroscopic measuring instrument includes: a spectrometer configured to make measurement of a reflection spectrum of an object for a light source and output measurement information representing a result of the measurement; a shadow projector comprising an object surface to receive light from the light source and one or more obstacles to allow light from the light source to cast one or more shadows on the object surface; an imaging device configured to record an image of an imaging area including the object surface and output image information representing the image of the imaging area; a storage interface removably connectable to a computer readable medium; and a processing device connected to the spectrometer, the imaging device and the storage interface, and configured to perform a measurement process of storing the measurement information from the spectrometer and the image information from the imaging device in the computer readable medium connected to the storage interface. The information processing system is configured to: obtain the measurement information and the image information by way of the computer readable medium; and identify a positional relationship between the light source and the spectrometer at the measurement based on one or more shadows of the one or more obstacles cast by light from the light source on the object surface present in the image of the imaging area represented by the image information.

According to the present disclosure, it is possible to provide a spectroscopic measuring instrument that can measurement of a reflection spectrum of an object relative to a light source and identification of a positional relationship between the light source and a spectrometer at the measurement.

DETAILED DESCRIPTION

Figure 1:
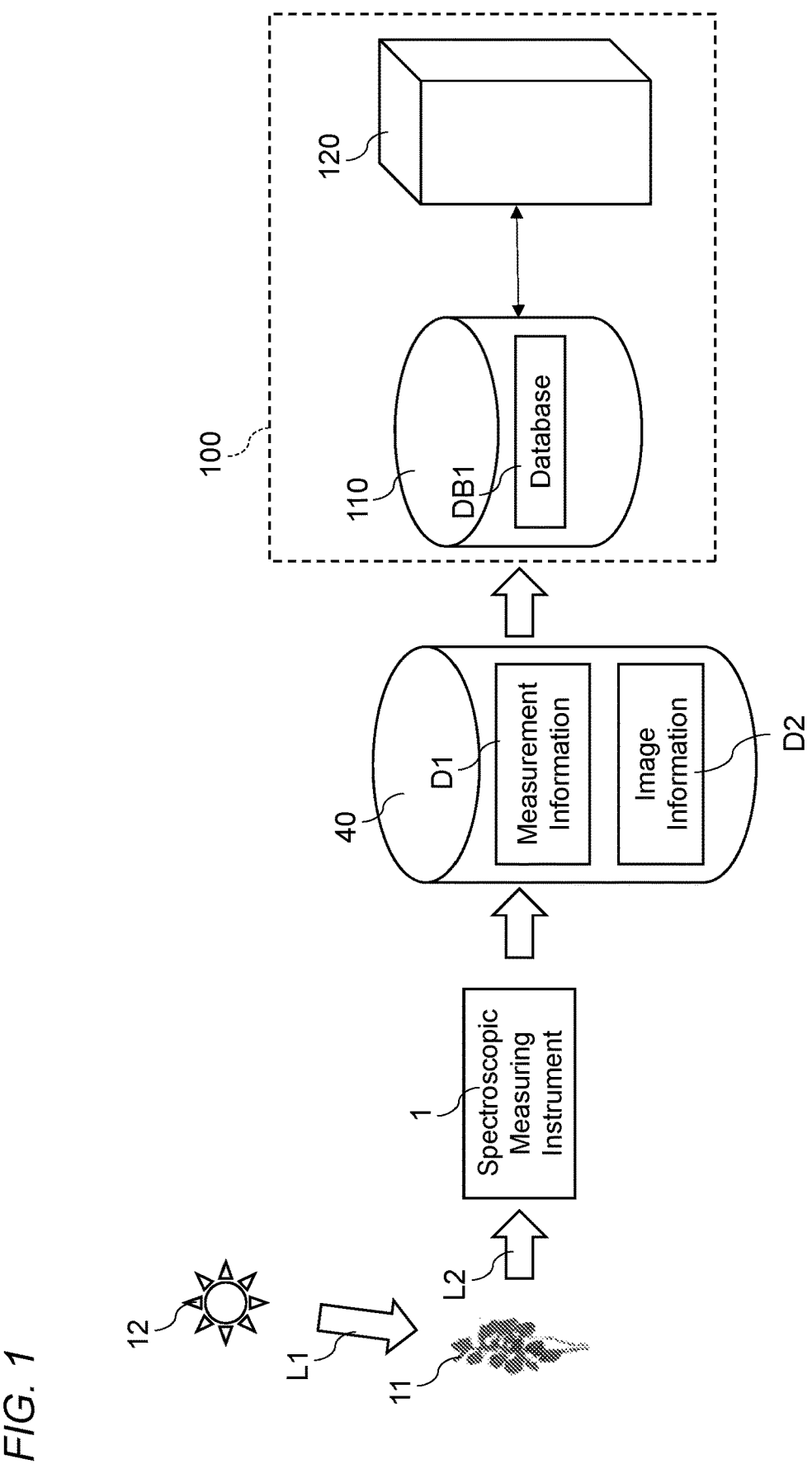
FIG. 1 is a schematic view of illustration for a use example of a spectroscopic measuring instrument according to one embodiment.

Hereinafter, embodiments are described in detail with appropriate reference to attached drawings. In some cases, descriptions detailed than needed may be omitted. Examples of description to be omitted may include detailed description of well-known items and redundant description for the same components. The purpose of such omission is to avoid the following description from being redundant than needed and to facilitate understanding of the skilled persons. Note that, the inventor(s) provide the following description and attached drawings to just allow the skilled person to fully understand the present disclosure and therefore have no intention to limit the subject matters set forth in claims by those.

The following positional relationship such as upward, downward, left and right are based on the positional relationship shown in the drawings, unless otherwise noted. The drawings referred to by the following embodiments are just schematic and it is not ensured that sizes and thicknesses of components shown in the drawings reflect actual dimensional ratios. Additionally, dimensional ratios of respective components are not limited to those shown in the drawings.

1. Embodiments

[1.1 Configuration]
[1.1.1 Overall Configuration]

FIG. 1 is a schematic view of illustration for a use example of a spectroscopic measuring instrument 1 according to the present embodiment. The spectroscopic measuring instrument 1 measures a reflection spectrum of an object 11 relative to a light source 12.

In the present embodiment, the object 11 is a rice plant. The object 11 may be a farm produce other than a rice plant. The object 11 may be a plant other than a farm produce. The object 11 is not limited to a plant, but may be an animal, a medication, a mineral, a food, or the like. The object 11 may be not only an individual but also a group. For example, the object 11 is not limited to a single tree but may be a group of trees present in a measurement area. The object 11 may be soil, rocks, minerals, stones, forests, oceans, and/or atmospheres as long as it or they can cause reflection spectra.

In the present embodiment, the light source 12 is the sun. The light source 12 is not limited to the sun but may be selected from various light sources including a halogen lamp, an LED lamp, an ultraviolet lamp, an infrared lamp. The light source 12 may be selected to enable obtainment of reflection spectra within a desired range of wavelengths from the object 11.

A result of measurement by the spectroscopic measuring instrument 1 will be used in a process performed by an information processing system 100. The spectroscopic measuring instrument 1 provides information to be processed by the information processing system 100.

The information processing system 100 is configured to perform or execute various information processes directed to the object 11. The information processing system 100 of FIG. 1 includes a database device 110 and a server device 120.

The database device 110 may be constituted by one or more computer systems. The database device 110 is configured to store database DB1. The database DB1 is available for information processes executable by the server device 120. The database DB1 is an aggregate of information used by the server device 120 and in the present embodiment the database DB1 may be referred to as a library DB1.

The database DB1 contains a plurality of records (entries) relating to the object 11. Each of the plurality of records includes "spectrum data", "measurement condition data", "state data", and "result data."

The spectrum data includes data of a reflection spectrum of the object 11 and data of a spectrum of the light source 12. The data of the reflection spectrum of the object 11 represents intensity of light which is part of light from the light source 12 and is reflected by the object 11, within a predetermined wavelength range at a predetermined wavelength interval. The data of the spectrum of the light source object 12 represents intensity of light from the light source 12 within a predetermined wavelength range at a predetermined wavelength interval. The predetermined wavelength range may be a range containing wavelengths of visible light and infrared light. The predetermined wavelength range may preferably be, for example, 400 nm to 1000 nm, but a range from 420 nm to 840 nm may be enough as the predetermined wavelength range. The predetermined wavelength interval is, for example, 4 nm. In the present embodiment, the spectrum data includes data directed to images. Examples of the image may include images directed to the object 11 and images directed to the light sources 12.

The measurement condition data represents conditions relating to measurement for obtaining the spectrum data. The reflection spectrum of the object 11 relative to the light source 12 measured by the spectroscopic measuring instrument 1 may be influenced by a positional relationship between the light source 12 and the spectroscopic measuring instrument 1. In brief, difference in the positional relationship between the light source 12 and the spectroscopic measuring instrument 1 may cause difference in the reflection spectrum measured by the spectroscopic measuring instrument 1 even for the same object 11. To make accurate assessment of the reflection spectrum of the object 11 relative to the light source 12, it is preferable to use information on this positional relationship between the light source 12 and the spectroscopic measuring instrument 1 at measurement.

Figure 2:
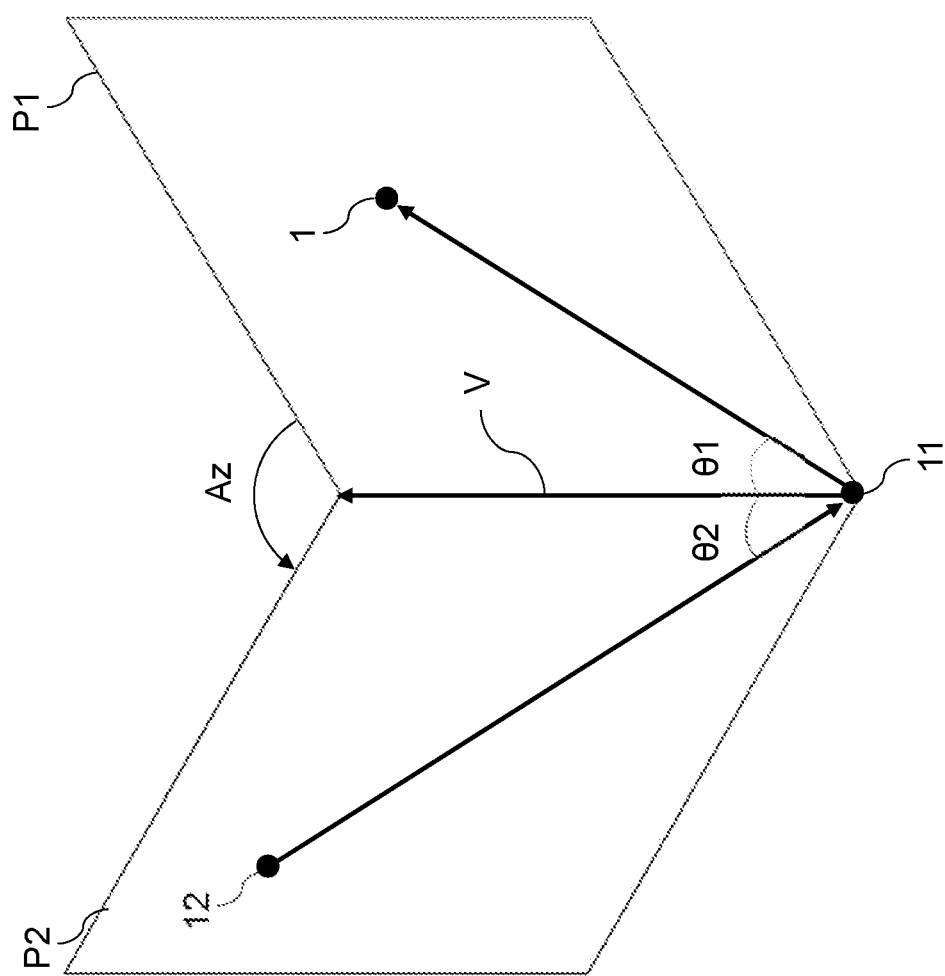
FIG. 2 is a view of illustration for measurement of reflection spectrum from an object relative to a light source, performed by the spectroscopic measuring instrument of FIG. 1.

FIG. 2 is a view of illustration for measurement of reflection spectrum from the object 11 relative to the light source 12, performed by the spectroscopic measuring instrument 1. The positional relationship between the light source 12 and the spectroscopic measuring instrument 1 may be identified by an angle of the spectroscopic measuring instrument 1 relative to the object 11, an angle of the light source 12 relative to the object 11, and an azimuth difference between the light source 12 and the spectroscopic measuring instrument 1. The angle of the spectroscopic measuring instrument 1 relative to the object 11 may be represented by an angle θ1 [°] of the spectroscopic measuring instrument 1 relative to a vertical direction V, or an angle (90°-θ1) of the spectroscopic measuring instrument 1 relative to a horizontal plane, for example. The angle of the light source 12 relative to the object 11 may be represented by an angle θ2 [°] of the light source 12 relative to the vertical direction V, or an angle (90°-θ2) of the light source 12 relative to the horizontal plane, for example. The azimuth difference between the light source 12 and the spectroscopic measuring instrument 1 may be represented by an angle Az [°] between a vertical plane P1 which includes the spectroscopic measuring instrument 1 and the object 11 and is perpendicular to the horizontal plane, and a vertical plane P2 which includes the light source 12 and the object 11 and is perpendicular to the horizontal plane, for example. In FIG. 2, Az is defined as increasing counterclockwise.

In the present embodiment, the measurement condition data includes, for example, the azimuth difference (Az) between the light source 12 and the spectroscopic measuring instrument 1, the angle (θ1) of the spectroscopic measuring instrument 1 relative to the object 11, and the angle (θ2) of the light source 12 relative to the object 11.

In addition, the measurement condition data relates to a condition or a state of the light source 12 at measurement. In one example, the measurement condition data includes an assessment value of spread of the light source 12. The assessment value of spread of the light source 12 represents a degree of scattering of light from the light source 12 caused by a surrounding environment of the object 11. The degree of scattering of light from the light source 12 caused by a surrounding environment of the object 11 is influenced by transparency of an atmosphere, weather (e.g., amount of clouds), or amount of aerosol in an atmosphere. In one example, the assessment value of spread of the light source 12 may be represented by a ratio of light scattered by the surrounding environment of the object 11 (scattered light component) to light directly reaching the object 11 from the light source 12 (direct light component). How light strikes the object 11 from the light source 12 is influenced by the surrounding environment of the object 11. For example, how light strikes the object 11 from the light source 12 is different between a fine weather and a cloudy weather. In the case of the fine weather, it may be considered that light strikes the object 11 from the light source 12 in one direction. While, in the case of the cloudy weather, light from the light source 12 may be scattered by clouds. In some cases light is considered to strike the object 11 from the light source 12 in all directions. Comparison between the respective cases of the fine and cloudy weathers may teach that the reflection spectrum may be more influenced by the positional relationship between the light source 12 and the spectroscopic measuring instrument 1 in the fine weather than in the cloudy weather. In view of the above, to make accurate assessment of the reflection spectrum of the object 11 relative to the light source 12, it is preferable that the measurement condition data includes the assessment value of the spread of the light source 12. The assessment value of the spread of the light source 12 enables quantification of degrees of cloudiness in the cases of fine and cloudy weathers or identification between the fine and cloudy weathers. In some cases, the assessment value of the spread of the light source 12 may be a value representing a grade regarding fine and cloudy weathers. For example, the assessment values may be five grades where "5" corresponds to the fine weather and "1" corresponds to the cloudy weather.

The database DB1 may preferably include, as to the same object 11, a plurality of records different in at least a combination of the azimuth difference (Az) between the light source 12 and the spectroscopic measuring instrument 1, the angle (θ1) of the spectroscopic measuring instrument 1 relative to the object 11, and the angle (θ2) of the light source 12 relative to the object 11. For example, the plurality of records may be given so that each of Az, θ1 and θ2 varies by every 20°, preferably every 10°, and more preferably every 5°.

The state data represents a state directed to the object 11. In the present embodiment, the object 11 is a rice plant and the state data relates to a state which is directed to a rice plant and may vary with time. Examples of the state data include assessment values relating to growth states, assessment values relating to pests, assessment values relating to contents, and assessment values relating to soil states. The state data may be obtained by performing inspection or the like at the time of measurement for obtaining the spectrum data.

The result data represents a result directed to the object 11. The result directed to the object 11 relates to an end point of the state of the object 11, for example. In the present embodiment, the object 11 is a rice plant and the result data thus may include data on a harvest which may be an end point of the growth state of the rice plant. Examples of the result data include harvest amount of a harvest period. The result data may be created at the timing of not measurement for obtaining the spectrum data but actual harvest of rice plants. The harvest amount may be measured after actual harvest of rice plants. The harvest period is determined based on the day of actual harvest of rice plants.

The server device 120 may be constituted by one or more computer systems. The server device 120 may be communicatively connected to the database device 110 via wired or wireless networks. The server device 120 is provided with a storage interface removably connectable to a computer readable medium 40 which would be described later.

The server device 120 may perform management of the database DB1. Examples of the management of the database DB1 may include addition, deletion and edit of records (entries) of the database DB1. In the present embodiment, the server device 120 can perform addition of records by use of information retrieved from the spectroscopic measuring instrument 1.

[1.1.2 Spectroscopic Measuring Instrument]

The spectroscopic measuring instrument 1 of FIG. 1 may be used to provide the spectrum data and the measurement condition data for the database DB1. Hereinafter, detailed description is given to the spectroscopic measuring instrument 1 with reference to FIG. 3 to FIG. 5.

Figure 3:
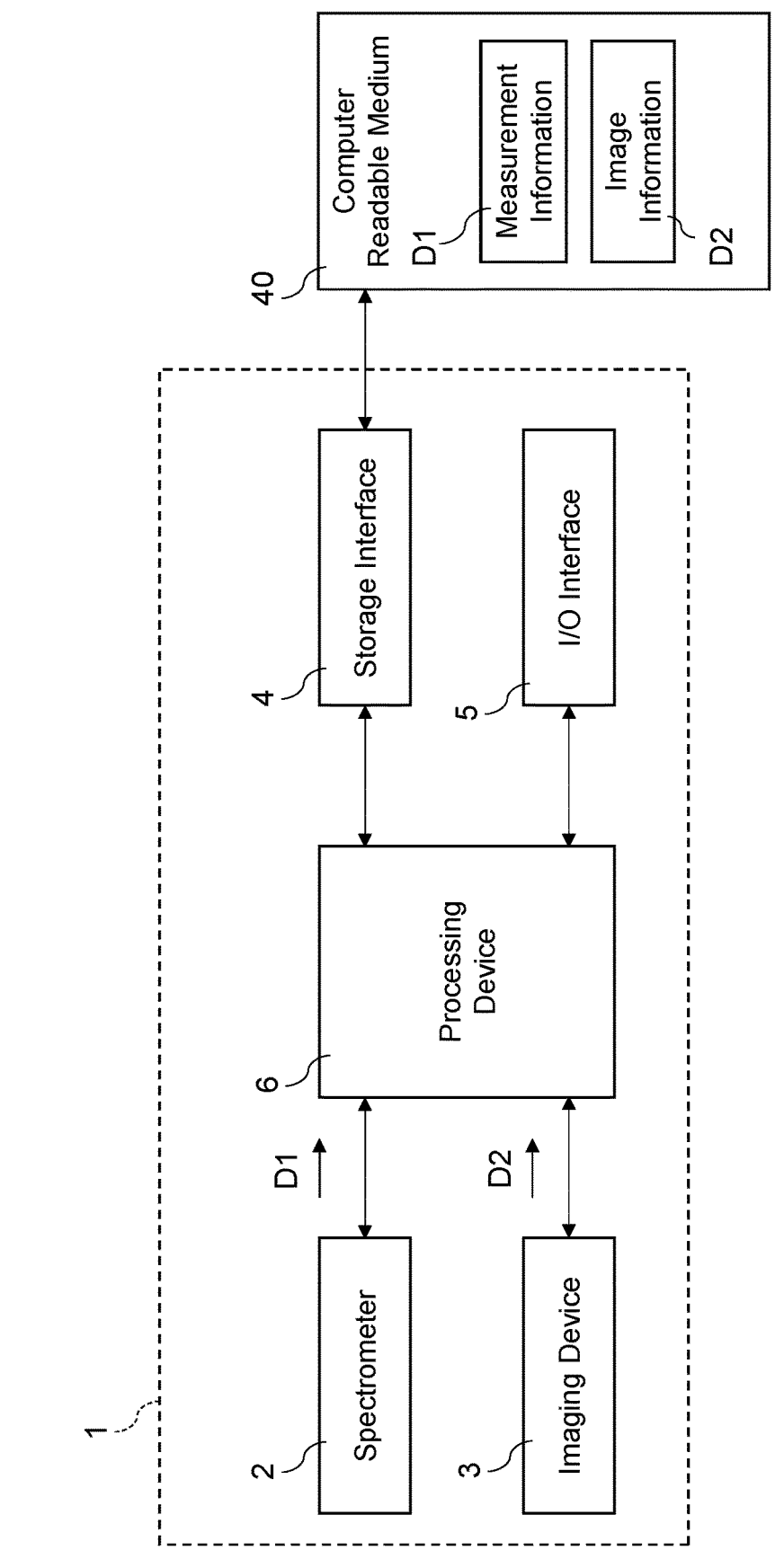
FIG. 3 is a block diagram of a configuration example of the spectroscopic measuring instrument of FIG. 1.
Figure 4:
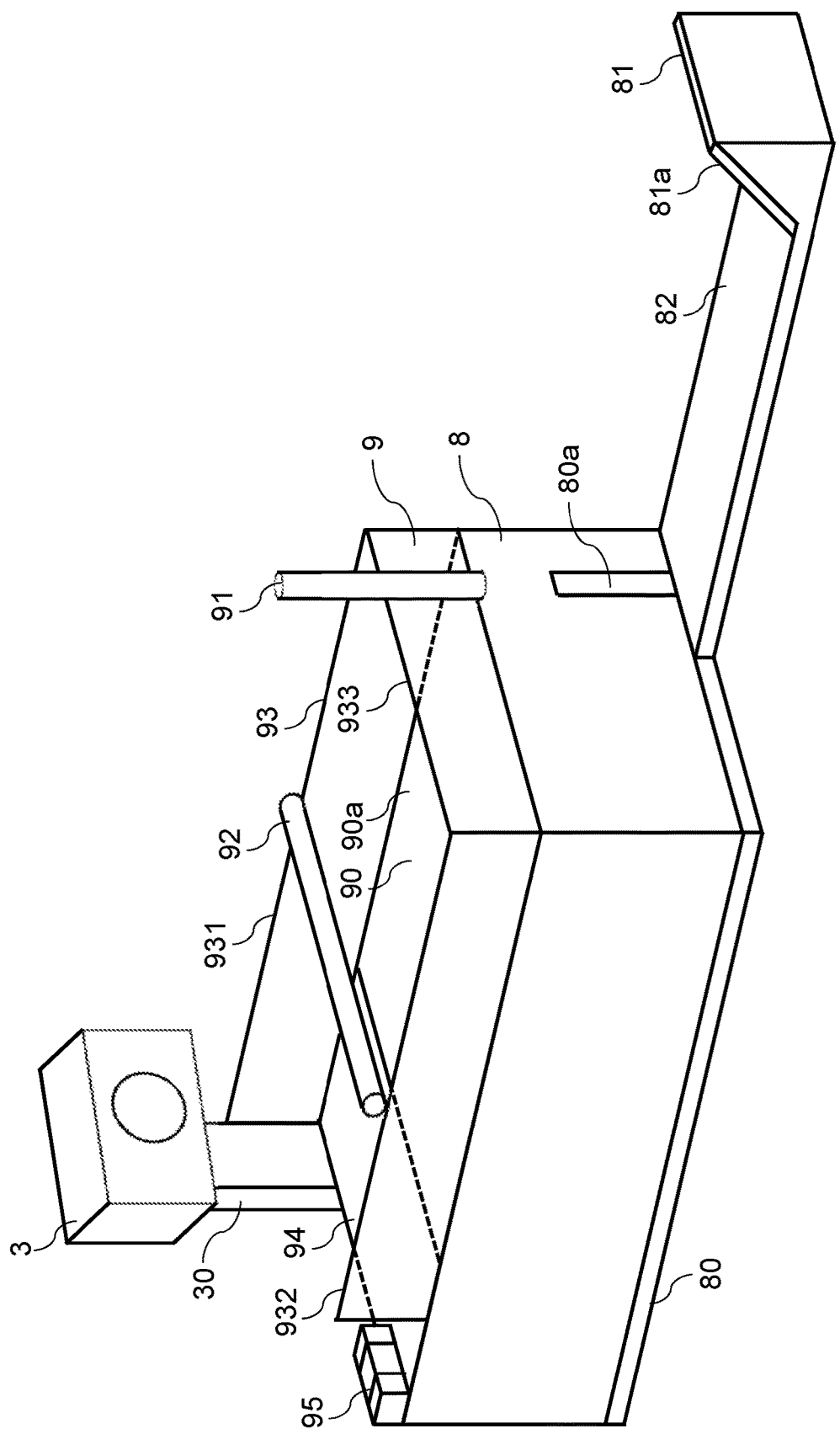
FIG. 4 is a schematic perspective view of the configuration example of the spectroscopic measuring instrument of FIG. 1.
Figure 5:
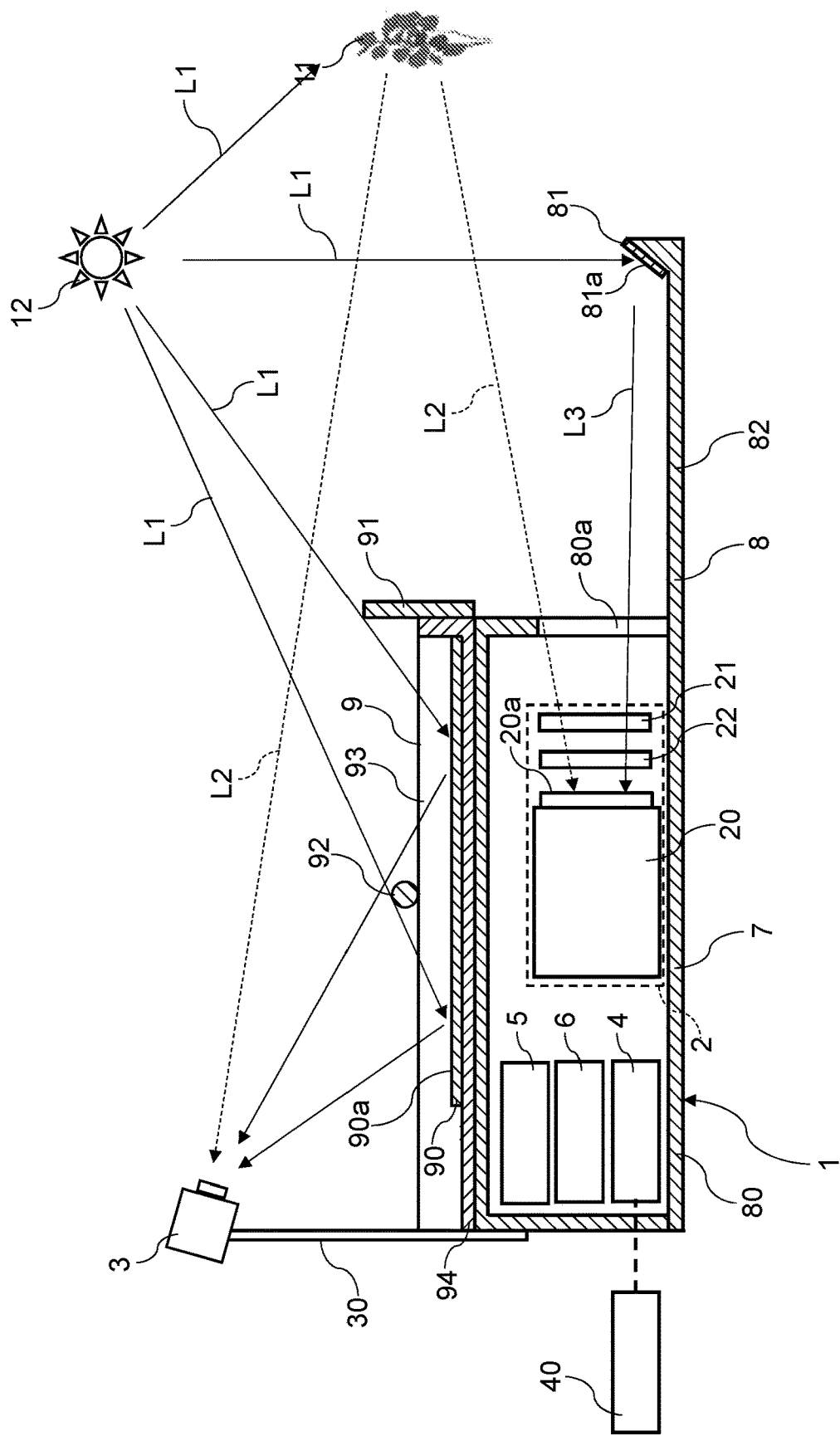
FIG. 5 is a section of the spectroscopic measuring instrument of FIG. 1.

FIG. 3 is a block diagram of a configuration example of circuitry of the spectroscopic measuring instrument 1. FIG. 4 is a perspective view of a configuration example of the spectroscopic measuring instrument 1. FIG. 5 is a schematic section of the spectroscopic measuring instrument 1.

As shown in FIG. 3, the spectroscopic measuring instrument 1 includes a spectrometer 2, an imaging device 3, a storage interface 4, an input/output (I/O) interface 5, and a processing device 6. As shown in FIG. 4 and FIG. 5, the spectroscopic measuring instrument 1 further includes a casing 7. Attached to the casing 7 are the spectrometer 2, the imaging device 3, the storage interface 4, the I/O interface 5, and the processing device 6. The casing 7 may removably accommodate a battery serving as a power source of the spectroscopic measuring instrument 1.

The casing 7 has its weight and size to be able to be easily carried or moved. In brief, the spectroscopic measuring instrument 1 is portable or mobile. Forward and rearward directions, upward or downward direction, and right and left directions of the casing 7 define forward or rearward direction, upward or downward direction, and right and left directions of the spectroscopic measuring instrument 1, respectively. As shown in FIG. 3 and FIG. 5, the casing 7 includes a body 8 and a shadow projector 9.

The body 8 of FIG. 4 and FIG. 5 includes a housing 80, a reflector 81 and a holder 82.

The housing 80 houses the spectrometer 2, the storage interface 4, the I/O interface 5 and the processing device 6. In the present embodiment, the housing 80 has a rectangular box shape. The housing 80 includes a front surface equipped with a slit 80*a*. The slit 80*a* is equipped to allow light from the outside of the housing 80 to strike the spectrometer 2.

The reflector 81 is positioned outside the housing 80 and faces the slit 80*a*. The reflector 81 includes a reflection surface 81*a* for reflecting light L1 from the light source 12 to allow the spectrometer 2 to receive the light L1 via the slit 80*a*. In the present embodiment, the reflection surface 81*a* is white. The reflection surface 81*a* is not limited to being white but may be gray or the like.

The holder 82 connects the reflector 81 to the housing 80 so that the reflector 81 is positioned outside the housing 80 and faces the slit 80*a*. In the present embodiment, the holder 82 extends from a surface of the housing 80, where the slit 80*a* is formed, and the reflector 81 is placed at the top end of the holder 82.

The shadow projector (or shadow caster) 9 includes one or more structures for allowing the light L1 from the light source 12 to cast one or more shadows. In other words, the shadow projector includes one or more shadow projection parts including a bar or a wall, or a series of bars or walls, which can create one or more shadows. Shadows cast by the shadow projector 9 can be used for determination of the positional relationship between the spectroscopic measuring instrument 1 and the light source 12. In the present embodiment, the shadow projector 9 is attached to the body 8. In FIG. 5, the shadow projector 9 is positioned on an upper surface of the housing 80 of the body 8.

The shadow projector 9 of FIG. 4 and FIG. 5 includes a flat plate 90, a plurality of obstacles (a first obstacle 91, a second obstacle 92 and a third obstacle 93), a support 94 and a level 95.

The support 94 defines a bottom of the shadow projector 9. The support 94 supports the flat plate 90 and the first to third obstacles 91, 92 and 93. The support 94 is attached on the upper surface of the housing 80 of the body 8. In the present embodiment, the support 94 has a rectangular plate shape.

The flat plate 90 is provided on the opposite side of the support 94 from the housing 80. An upper surface of the flat plate 90 is flat. The upper surface of the flat plate 90 is used as an object surface 90*a* for receiving the light L1 from the light source 12. The color of the upper surface of the flat plate 90 is, for example, a color for facilitating identification of shadows, such as white. In the present embodiment, the flat plate 90 is rectangular and the object surface 90*a* is also rectangular. A direction perpendicular to the object surface 90*a* correspond to the upward or downward direction of the spectroscopic measuring instrument 1. A forward or rearward direction (in the present embodiment, a length direction) of the object surface 90*a* correspond to the forward or rearward direction of the spectroscopic measuring instrument 1. A left or right direction (in the present embodiment, a width direction) of the object surface 90*a* correspond to the left or right direction of the spectroscopic measuring instrument 1.

The level 95 can be used to align the left or right direction (X direction) of the object surface 90*a* with the horizontal direction. This allows more accurate alignment of the X direction of the object surface 90*a* with the horizontal direction than in the case where persons align the X direction of the object surface 90*a* with the horizontal direction by using their sense. Use of the level 95 facilitates positioning of the spectroscopic measuring instrument 1. In the present embodiment, the level 95 is disposed on the support 94. The level 95 may be positioned to be easily visually perceived by a person at the time of use of the spectroscopic measuring instrument 1.

The first to third obstacles 91, 92 and 93 are provided to allow the light L1 from the light source 12 to cast shadows on the object surface 90*a*. In some cases, depending on the positional relationship between the light source 12 and the spectroscopic measuring instrument 1, no shadow may be cast on the object surface 90*a*. The first to third obstacles 91, 92 and 93 are located to be included in the imaging area of the imaging device 3. This may facilitate comparison between the first to third obstacles 91, 92 and 93 and shadows cast on the object surface 90*a* by the first to third obstacles 91, 92 and 93.

The first obstacle 91 is a vertical bar extending in a direction perpendicular to the object surface 90*a*. The first obstacle 91 of FIG. 5 has a round bar shape with a constant diameter. The first obstacle 91 is positioned to serve as an indicator for a direction of the spectrometer 2. In the present embodiment, the first obstacle 91 is positioned at a first end in the length direction of the object surface 90*a* (the right end in FIG. 5). As shown FIG. 4, the position of the first obstacle 91 corresponds to the position of the slit 80*a* of the housing 80. In detail, in a direction perpendicular to the object surface 90*a*, the obstacle 91 and the slit 80*a* are arranged in line. Use of the obstacle 91 can help setting of a direction of the spectroscopic measuring instrument 1 relative to the object 11, especially the direction of the spectrometer 2. Therefore, it is possible to facilitate positioning of the spectroscopic measuring instrument 1. Additionally, the first obstacle 91 can be used as a reference to align a direction perpendicular to the object surface 90*a* with the vertical direction. Therefore, it is possible to facilitate a procedure of aligning a direction perpendicular to the object surface 90*a* with the vertical direction. Accordingly, the positioning of the spectroscopic measuring instrument 1 can be facilitated.

The second obstacle 92 is a horizontal bar extending in the left or right direction of the object surface 90*a*. The second obstacle 92 of FIG. 5 has a round bar shape with a constant diameter. The second obstacle 92 has a length passing through the object surface 90*a* in the width direction of the object surface 90*a*. The second obstacle 92 is disposed over the object surface 90*a* by a predetermined distance apart from the object surface 90*a*. The second obstacle 92 can be used as a reference to align the left or right direction of the object surface 90*a* with the horizontal direction. Therefore, it is possible to facilitate a procedure of aligning the left or right direction of the object surface 90*a* with the horizontal direction. Accordingly, the positioning of the spectroscopic measuring instrument 1 can be facilitated.

The third obstacle 93 is a wall defining at least part of an outer periphery of the object surface 90*a*. The third obstacle 93 can be used to delimit an extent of the object surface 90a and therefore clarify the extent of the object surface 90a. The third obstacle 93 can reduce possibilities that shadows of unnecessary or unintentional objects are cast on the object surface 90a. In the present embodiment, the third obstacle 93 includes a first wall part 931 positioned at a first end in the width direction of the object surface 90a, a second wall part 932 positioned at a second end in the width direction of the object surface 90a, and a third wall part 933 positioned at the first end in the length direction of the object surface 90a. A height of the first wall part 931, a height of the second wall part 932 and a height of the third wall part 933 each are uniform and are the same as each other. In the present embodiment, the first wall part 931 and the second wall part 932 of the third obstacle 93 are used to dispose the second obstacle 92 apart from the object surface 90a by a predetermined distance therefrom.

Hereinafter, description is given to relationships between shadows cast by the shadow projector 9 and the light source 12 with reference to FIG. 6 to FIG. 10. As to FIG. 6 to FIG. 10, only for simplification of the description, the left or right direction of the object surface 90a may be referred to as the X direction, the forward or rearward direction of the object surface 90a may be referred to as the Y direction, and the direction perpendicular to the object surface 90a may be referred to as the Z direction. In FIG. 6 to FIG. 10, the left or right direction of the object surface 90a corresponds to the horizontal direction in an actual space.

Figure 6:
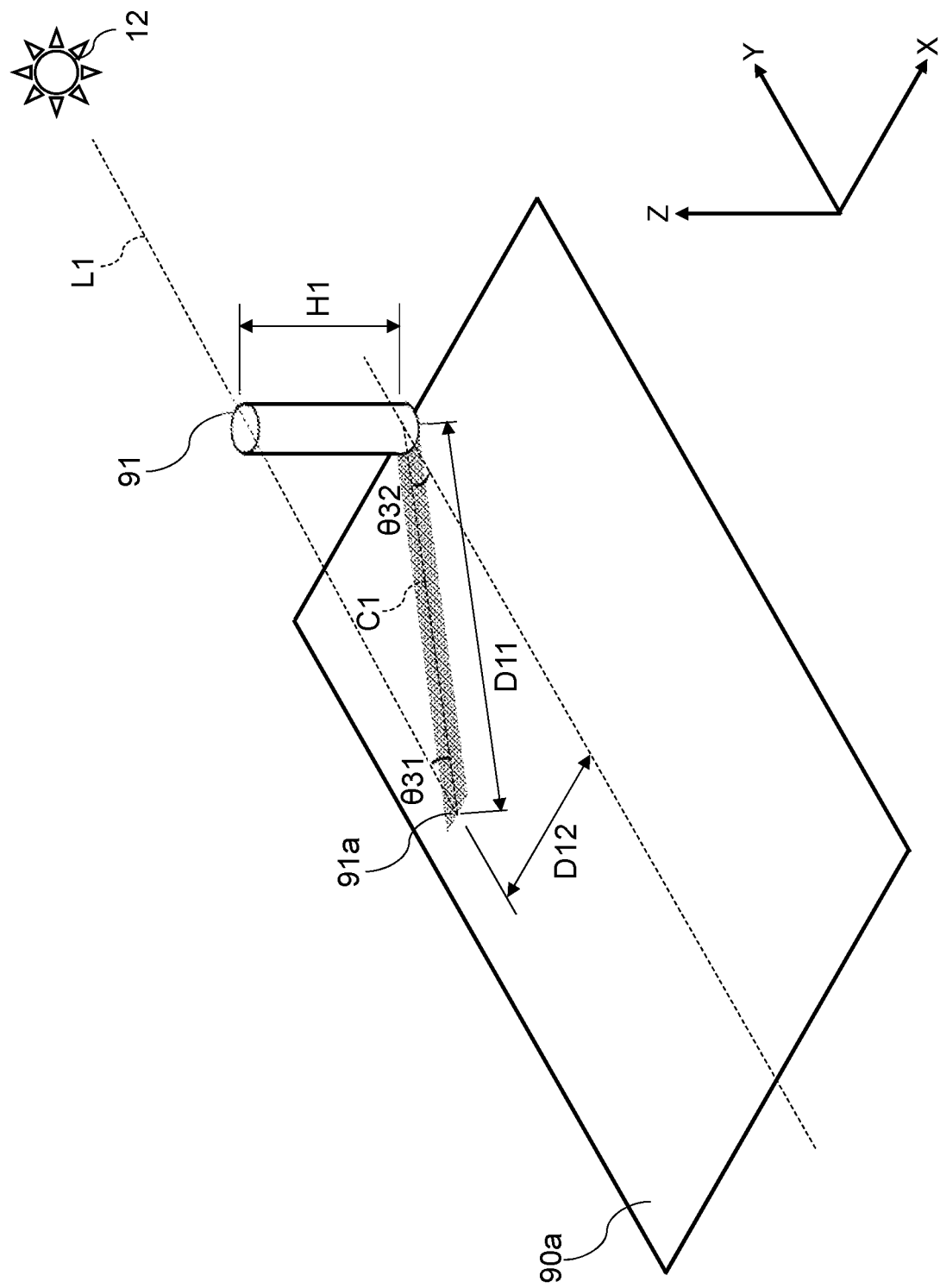
FIG. 6 is a schematic view of illustration for one example of a relationship between a first obstacle of a shadow projector of the spectroscopic measuring instrument of FIG. 1 and a light source.

FIG. 6 is a schematic view of illustration for one example of a relationship between the first obstacle 91 of the shadow projector 9 and the light source 12. In FIG. 6, only for simplification of the description, illustrations of the second obstacle 92 and the third obstacle 93 are omitted. In FIG. 6, only for simplification of the description, the first obstacle 91 is located at the center in the width direction of the object surface 90a.

As shown in FIG. 6, the first obstacle 91 blocks the light L1 from the light source 12 and thereby a shadow 91a is cast on the object surface 90a by the first obstacle 91. One of conditions for casting the shadow 91a of FIG. 6 is that the azimuth difference (Az) between the light source 12 and the spectroscopic measuring instrument 1 satisfies a relation of 90°≤Az≤270°. In FIG. 6, suppose that D11 denotes a length of the shadow 91a, H1 denotes the height of the first obstacle 91, and θ31[°] denotes an angle of the light source 12 relative to the object surface 90a, θ31 can be represented by the following formula (1).

$$\theta 31 = \tan^{-1}\left(\frac{H1}{D11}\right) \tag{1}$$

In one example, in terms of the angle (θ1) of the spectroscopic measuring instrument 1 relative to the object 11, the angle (θ2) of the light source 12 relative to the object 11, and the angle (θ31) of the light source 12 relative to the object surface 90a, the equation of θ1+θ2+θ31=180° is established. θ31 can be determined by the formula (1) and θ2 can be identified by the location of the object 11 and the time. Therefore, when θ31 is determined, θ1 can be identified.

Suppose that D12 denotes the length of the shadow 91a in the X direction of FIG. 6 and the θ32 [°] denotes the angle of the center line C1 of the shadow 91a relative to the Y direction, θ32 can be represented by the following formula (2).

$$\theta 32 = \sin^{-1}\left(\frac{D12}{D11}\right) \tag{2}$$

A direction of the light source 12 is an opposite direction from a direction from the first obstacle 91 to the shadow 91a. The azimuth difference (Az) between the light source 12 and the spectroscopic measuring instrument 1 can be given by an equation of Az=180+θ32.

From the shadow 91a of the first obstacle 91, it is possible to calculate the azimuth difference (Az) between the light source 12 and the spectroscopic measuring instrument 1 and the angle (θ1) of the spectroscopic measuring instrument 1 relative to the object 11.

Figure 7:
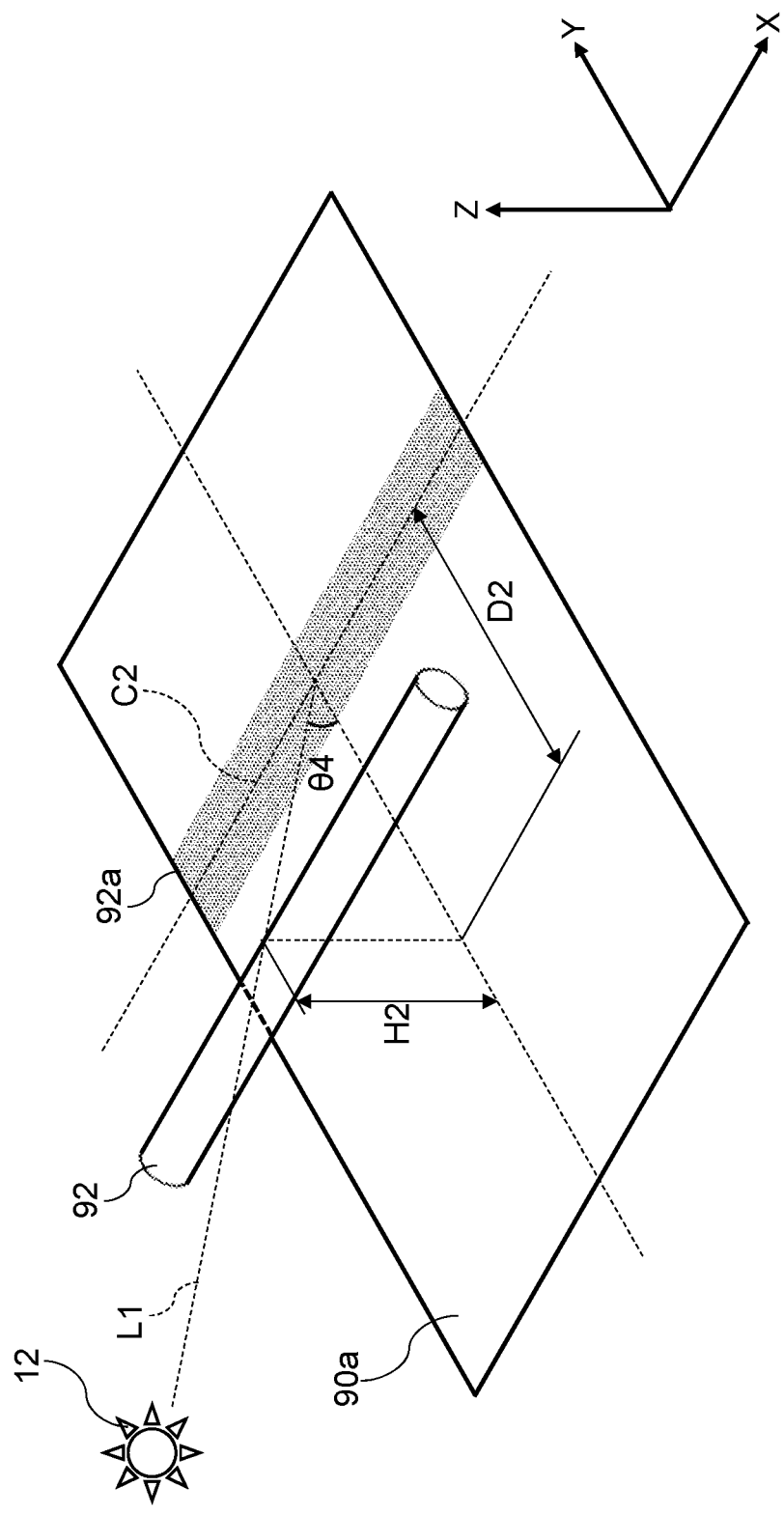
FIG. 7 is a schematic view of illustration for one example of a relationship between a second obstacle of the shadow projector of the spectroscopic measuring instrument of FIG. 1 and the light source.

FIG. 7 is a schematic view of illustration for one example of a relationship between the second obstacle 92 of the shadow projector 9 and the light source 12. In FIG. 7, only for simplification of the description, illustrations of the first obstacle 91 and the third obstacle 93 are omitted.

As shown in FIG. 7, the second obstacle 92 blocks the light L1 from the light source 12 and thereby a shadow 92a is cast on the object surface 90a by the second obstacle 92. One of conditions for casting the shadow 92a of FIG. 7 is that the azimuth difference (Az) between the light source 12 and the spectroscopic measuring instrument 1 satisfies a relation of 0°≤Az<90° or 270°<Az<360°. In FIG. 7, suppose that D2 denotes a distance between the second obstacle 92 and the shadow 92a in the Y direction, H2 denotes the height of the second obstacle 92, and θ4 [°] denotes an angle of the light source 12 relative to the object surface 90a, θ4 can be represented by the following formula (3).

$$\theta 4 = \tan^{-1}\left(\frac{H2}{D2}\right) \tag{3}$$

Figure 8:
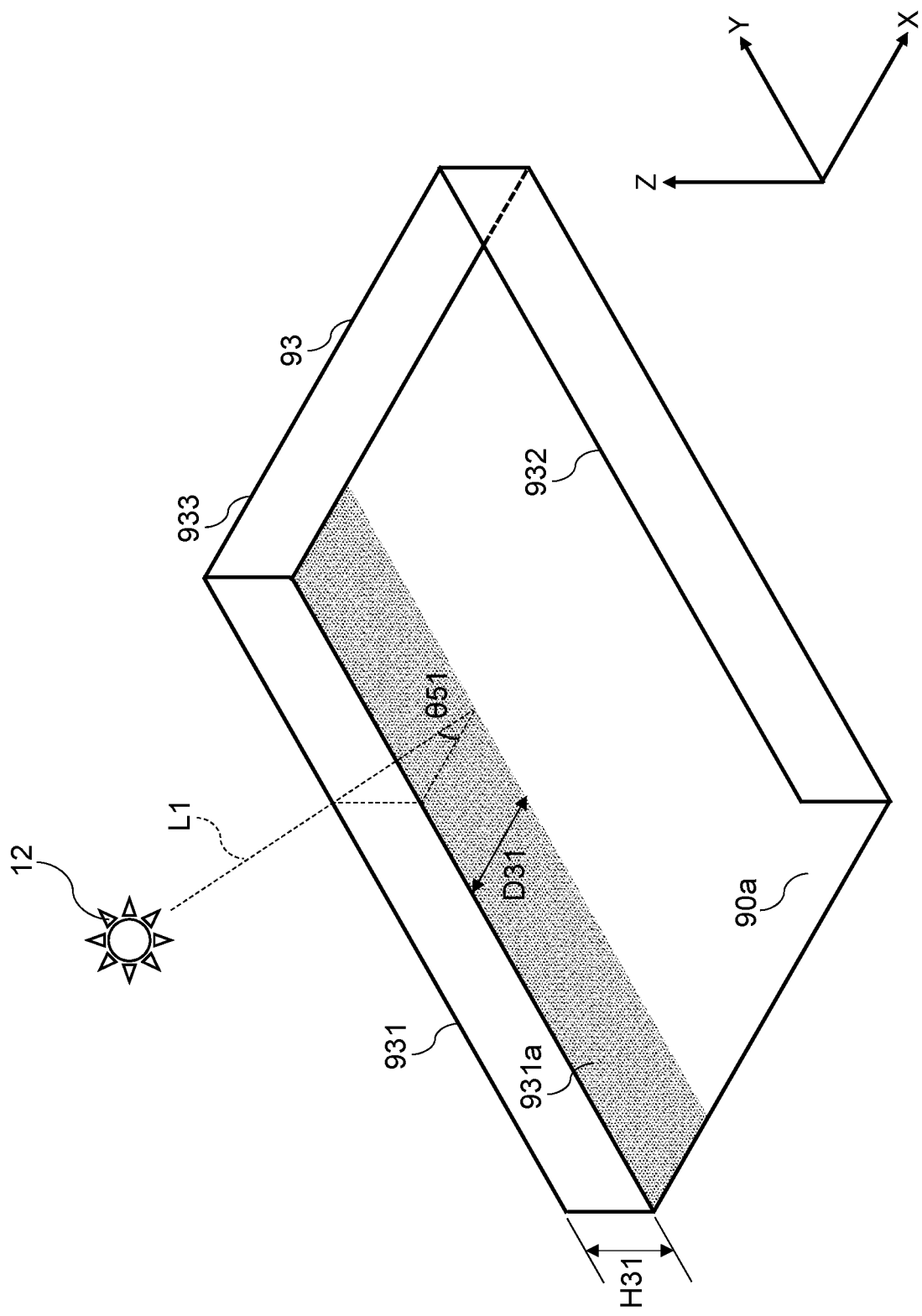
FIG. 8 is a schematic view of illustration for a first example of a relationship between a third obstacle of the shadow projector of the spectroscopic measuring instrument of FIG. 1 and the light source.
Figure 9:
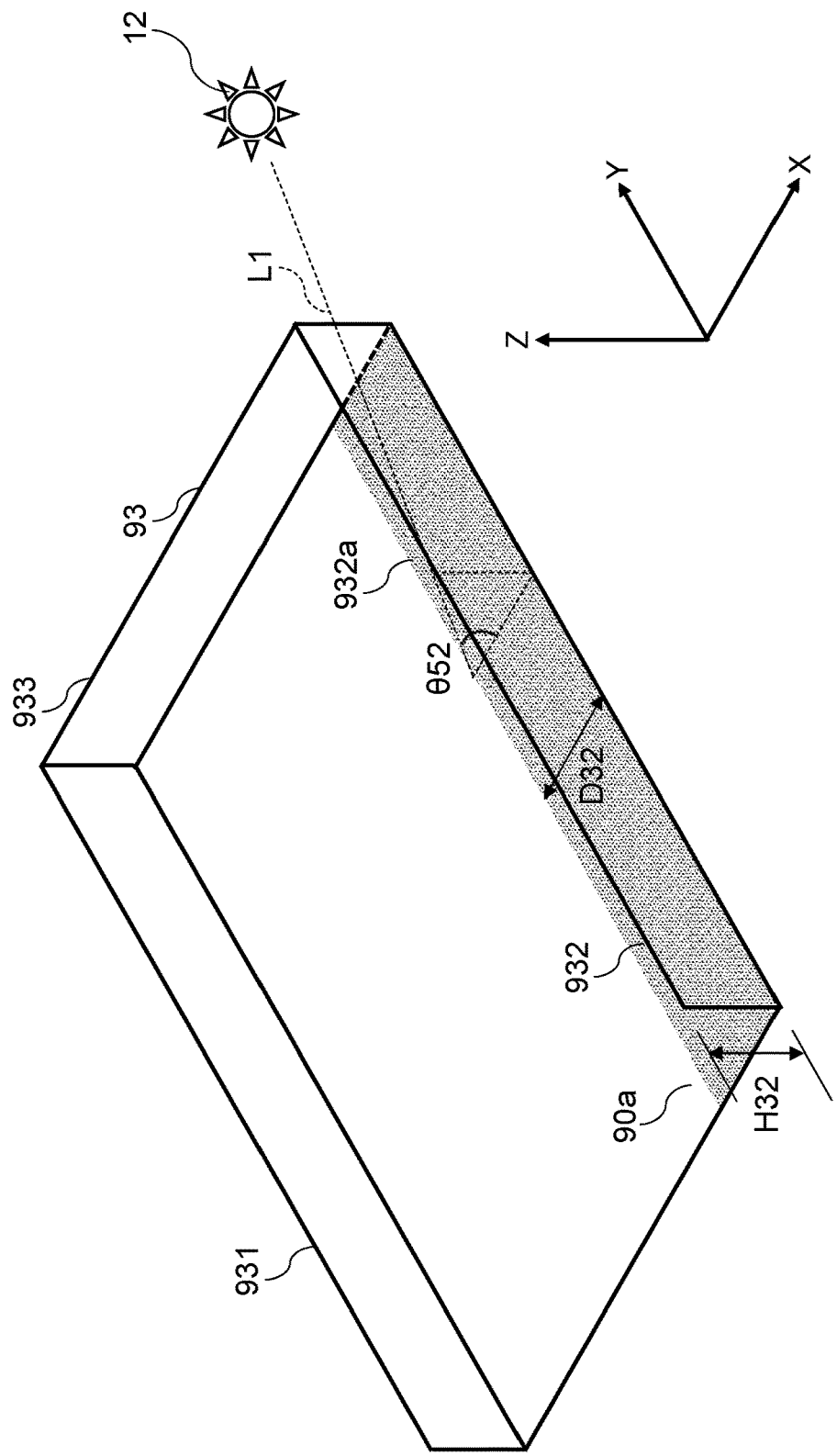
FIG. 9 is a schematic view of illustration for a second example of the relationship between the third obstacle and the light source.
Figure 10:
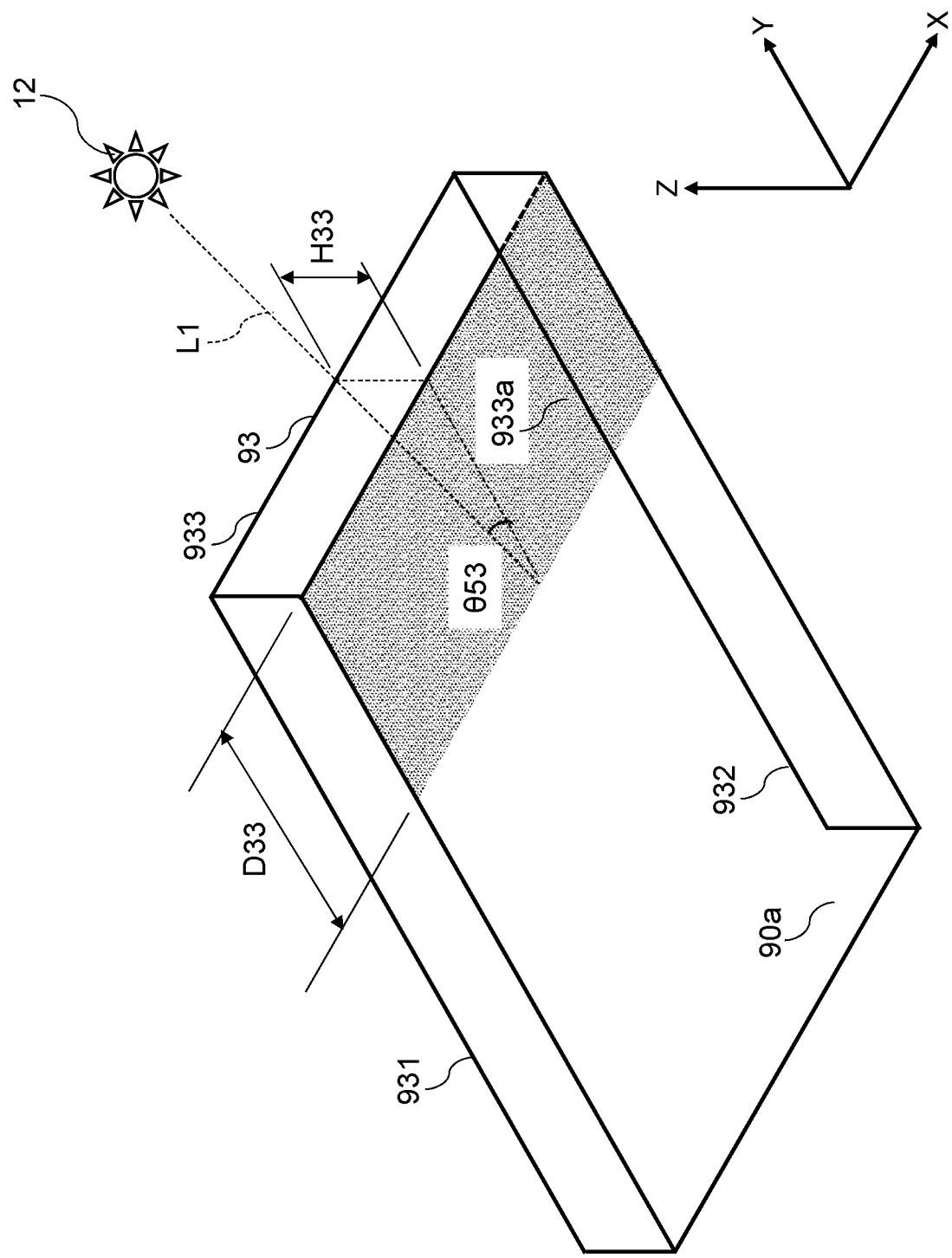
FIG. 10 is a schematic view of illustration for a third example of the relationship between the third obstacle and the light source.

Each of FIG. 8 to FIG. 10 is a schematic view of illustration for one example of a relationship between the third obstacle 93 of the shadow projector 9 and the light source 12. In each of FIG. 8 to FIG. 10, only for simplification of the description, illustrations of the first obstacle 91 and the second obstacle 92 are omitted As shown in FIG. 8, the first wall part 931 of the third obstacle 93 blocks the light L1 from the light source 12 and thereby a shadow 931a is cast on the object surface 90a by the first wall part 931 of the third obstacle 93. One of conditions for casting the shadow 931a of FIG. 8 is that the azimuth difference (Az) between the light source 12 and the spectroscopic measuring instrument 1 satisfies a relation of 180°<Az<360°. In FIG. 8, suppose that D31 denotes a length of the shadow 931a in the X direction, H31 denotes a height of the first wall part 931, and θ51 [°] denotes an angle of the light source 12 relative to the object surface 90a in an XZ plane, θ51 can be represented by the following formula (4).

$$\theta 51 = \tan^{-1}\left(\frac{H31}{D31}\right) \tag{4}$$

As shown in FIG. 9, the second wall part 932 of the third obstacle 93 blocks the light L1 from the light source 12 and thereby a shadow 932a is cast on the object surface 90a by the second wall part 932 of the third obstacle 93. One of conditions for casting the shadow 932a of FIG. 9 is that the azimuth difference (Az) between the light source 12 and the spectroscopic measuring instrument 1 satisfies a relation of 0°<Az<180°. In FIG. 9, suppose that D32 denotes a length of the shadow 932a in the X direction, H32 denotes a height of the second wall part 932, and θ52 [°] denotes an angle of the light source 12 relative to the object surface 90a in an XZ plane, θ52 can be represented by the following formula (5).

$$\theta 52 = \tan^{-1}\left(\frac{H32}{D32}\right) \quad (5)$$

As shown in FIG. 10, the third wall part 933 of the third obstacle 93 blocks the light L1 from the light source 12 and thereby a shadow 933a is cast on the object surface 90a by the third wall part 933 of the third obstacle 93. One of conditions for casting the shadow 933a of FIG. 10 is that the azimuth difference (Az) between the light source 12 and the spectroscopic measuring instrument 1 satisfies a relation of 90°<Az<270°. In FIG. 10, suppose that D33 denotes a length of the shadow 933a in the Y direction, H33 denotes a height of the third wall part 933, and θ53 [°] denotes an angle of the light source 12 relative to the object surface 90a in an YZ plane, θ53 can be represented by the following formula (6).

$$\theta 53 = \tan^{-1}\left(\frac{H33}{D33}\right) \quad (6)$$

It is possible to calculate the angle of the light source 12 relative to the object surface 90a and the azimuth difference (Az) between the light source 12 and the spectroscopic measuring instrument 1, based on states of the shadow 92a cast by the second obstacle 92 and the shadows 931a, 932a, and 933a cast by the third obstacle 93.

In one example, when 0°<Az<90°, the angle of the light source 12 relative to the object surface 90a and Az can be determined by a vector representing an intersection between a plane with the angle θ4 relative to the object surface 90a within the YZ plane and a plane with the angle θ52 relative to the object surface 90a within the XZ plane. When 90°<Az<180°, the angle of the light source 12 relative to the object surface 90a and Az can be determined by a vector representing an intersection between a plane with the angle θ53 relative to the object surface 90a within the YZ plane and a plane with the angle θ52 relative to the object surface 90a within the XZ plane. When 180°<Az<270°, the angle of the light source 12 relative to the object surface 90a and Az can be determined by a vector of an intersection between a plane with the angle θ51 relative to the object surface 90a within the YZ plane and a plane with the angle θ53 relative to the object surface 90a within the XZ plane. When 270°<Az<360°, the angle of the light source 12 relative to the object surface 90a and Az can be determined by a vector of an intersection between a plane with the angle θ4 relative to the object surface 90a within the YZ plane and a plane with the angle θ51 relative to the object surface 90a within the XZ plane.

Shapes of shadows cast by the shadow projector 9 are determined by shapes of obstacles but may be influenced by the spread of the light source 12. The spread of the light source 12 corresponds to the degree of scattering of light from the light source 12 caused by the surrounding environment of the object 11. The degree of scattering of light from the light source 12 caused by the surrounding environment of the object 11 may depend on transparency of an atmosphere, e.g., amount of clouds. In the case of the fine weather, the degree of scattering of light from the light source 12 caused by the surrounding environment of the object 11 is relatively small and in contrast in the case of the cloudy weather the degree of scattering of light from the light source 12 caused by the surrounding environment of the object 11 is relatively large.

Figure 11:
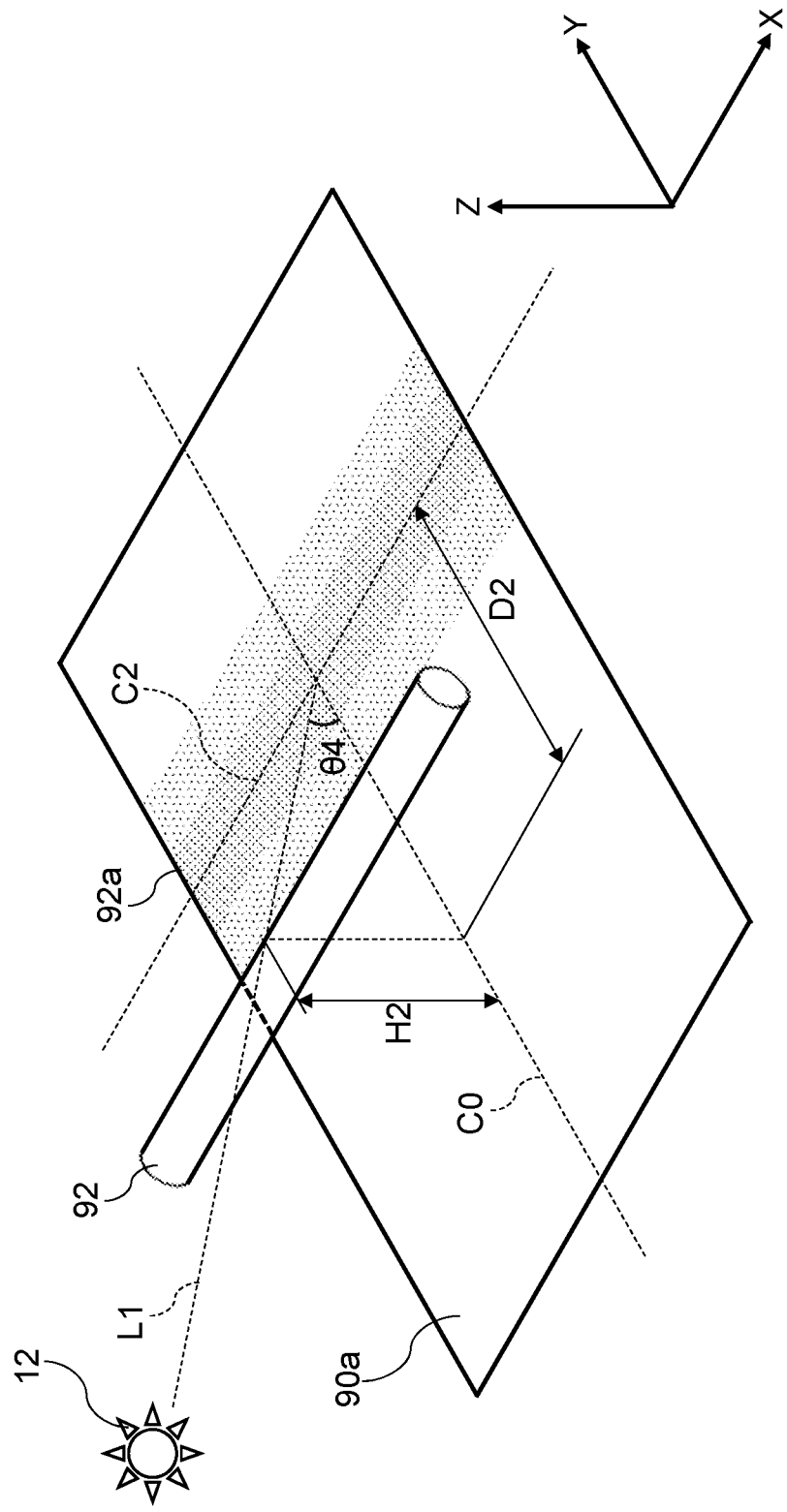
FIG. 11 is a schematic view of illustration for another example of the relationship between the second obstacle of FIG. 7 and the light source.

Influences on shadows caused by the spread of the light source 12 are described with reference to FIG. 7 and FIG. 11. FIG. 11 is a schematic view of illustration for another example of the relationship between the second obstacle 92 of FIG. 7 and the light source 12. FIG. 7 corresponds to a case where the spread of the light source 12 is relatively small, that is, the fine weather case. FIG. 11 corresponds to a case where the spread of the light source 12 is relatively large, that is, the cloudy weather case. FIG. 7 and FIG. 11 teach that the width of the shadow 92a tends to increase with an increase in the spread of the light source 12 and the width of the shadow 92a tends to decrease with a decrease in the spread of the light source 12. This means that an increase in the spread of the light source 12 reduces clarity of the shadow 92a.

Figure 12:
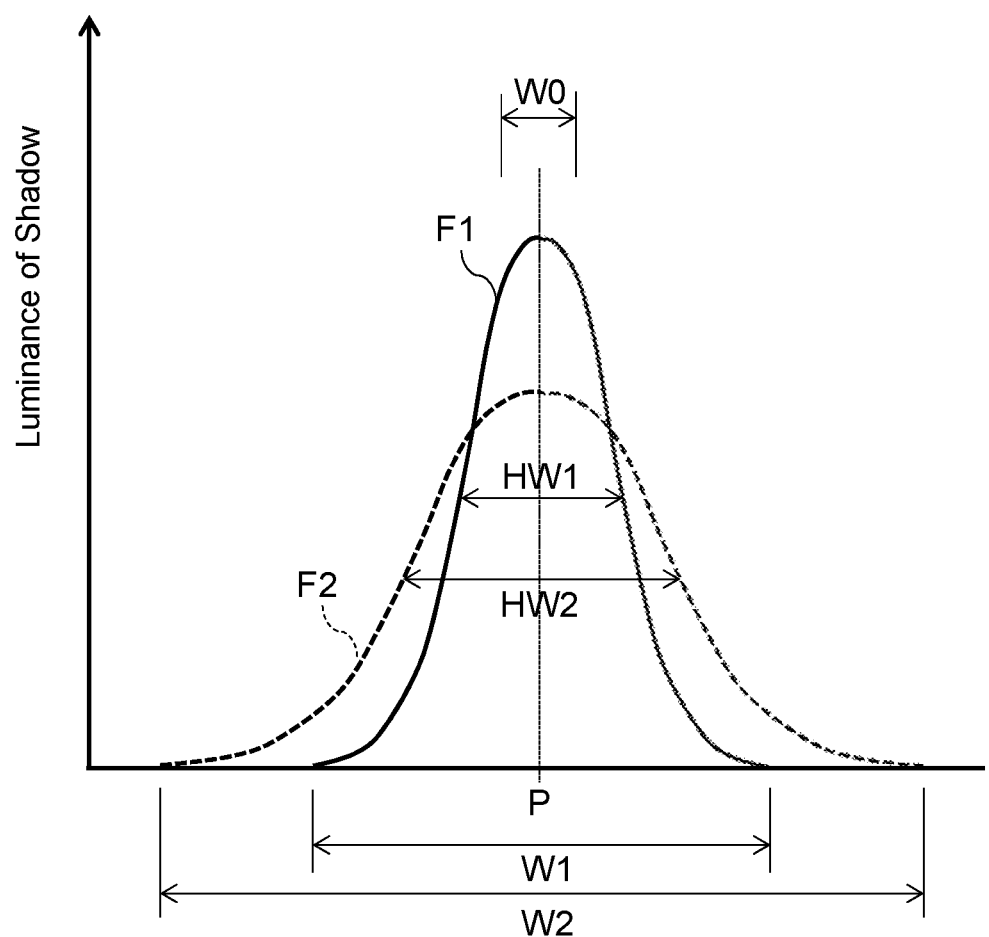
FIG. 12 is a graph of a distribution of an intensity of a shadow cast by the shadow projector of the spectroscopic measuring instrument of FIG. 1.

FIG. 12 is a graph of a distribution of a luminance of a shadow cast by the shadow projector 9 of the spectroscopic measuring instrument 1, especially the shadow 92a cast by the second obstacle 92. In FIG. 12, F1 represents a distribution of the luminance of the shadow 92a when the spread of the light source 12 is relatively small, and F2 represents a distribution of the luminance of the shadow 92a when the spread of the light source 12 is relatively large. In FIG. 12, P represents a center position of the shadow 92a. W1 represents a full width of the shadow 92a when the spread of the light source 12 is relatively small, and W2 represents a full width of the shadow 92a when the spread of the light source 12 is relatively large. HW1 represents a half width (herein, a full width at half maximum) of the shadow 92a when the spread of the light source 12 is relatively small, and HW2 represents a half width (herein, a full width at half maximum) of the shadow 92a when the spread of the light source 12 is relatively large. There may be a correlation between the spread of the light source 12 and a full width at half maximum (or a half width at half maximum) of a shadow. Accordingly, it is possible to determine the assessment value of the spread of the light source 12 based on the full width at half maximum of the shadow. For example, the full width at half maximum of the shadow can be determined from the image of the imaging area represented by the image information D2. The full width at half maximum can be determined by extracting a region corresponding to the shadow from the image of the imaging area and then calculating the distribution of luminance of the shadow for the width of the shadow.

The aforementioned shadow projector 9 can provide information for identifying the aforementioned measurement condition data. In more detail, presence of the shadow projector 9 enables determination of: the azimuth difference (Az) between the light source 12 and the spectroscopic measuring instrument 1; the angle (θ1) of the spectroscopic measuring instrument 1 relative to the object 11; the angle (θ2) of the light source 12 relative to the object 11; and the assessment value of the spread of the light source 12, of the measurement condition data.

The spectrometer 2 is configured to make measurement of a reflection spectrum of the object 11 relative to the light source 12 and output the measurement information D1 representing a result of the measurement. The spectrometer 2 of FIG. 3 includes a detector 20, a spectroscopic component 21, and a lens 22.

Figure 13:
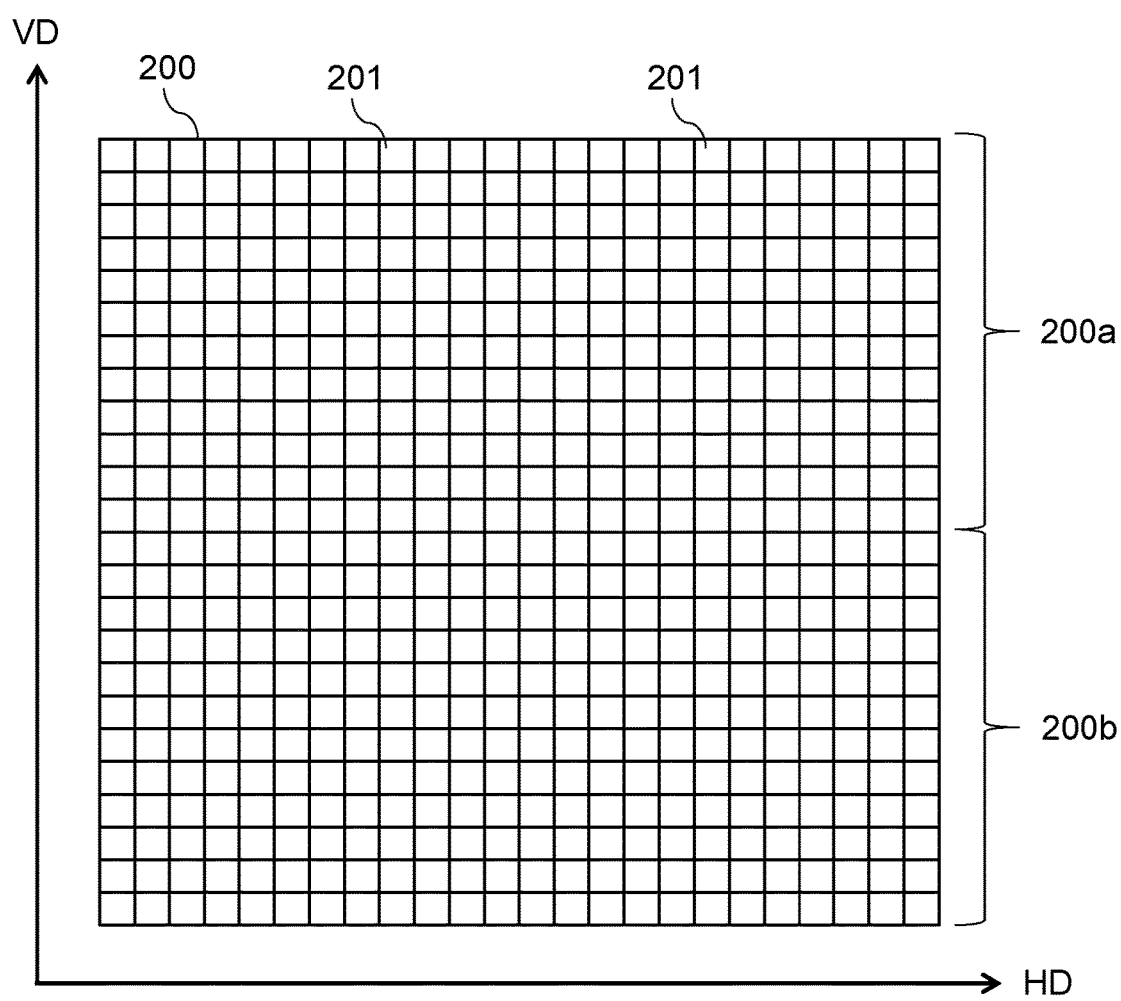
FIG. 13 is a schematic view of an imaging plane of a spectrometer of the spectroscopic measuring instrument of FIG. 1.

The detector 20 is disposed inside the housing 80 to receive external light via the slit 80a. The detector 20 has sensitivity for a predetermined wavelength range. The predetermined wavelength range may ranges from 420 nm to 840 nm, for example. The detector 20 includes an image sensor and a processor, for example. Examples of the image sensor include a CMOS image sensor and a CCD image sensor. The detector 20 includes an imaging plane 200. FIG. 13 is a schematic view of the imaging plane 200. The imaging plane 200 of FIG. 13 includes a plurality of pixels 201 arranged in a vertical direction VD and a horizontal direction HD. In FIG. 13, the number of pixels 201 is 24×24 and this is only for simplification of illustration for the imaging plane 200. The number of pixels 201 constituting the imaging plane 200 may be prepared to be sufficient for a wavelength range of a desired reflection spectrum. In the present embodiment, the slit 80a extends in the vertical direction VD. A length direction of the slit 80a corresponds to the vertical direction VD and a width direction of the slit 80a corresponds to the horizontal direction HD. The vertical direction VD and the horizontal direction HD are not directions in an actual space but may be just defined with respect to arrangement of pixels 201 in the imaging plane 200. A wavelength resolution for the detector 20 may be determined by the width of the slit 80a. Decreasing the width of the slit 80a may decrease the wavelength resolution. The wavelength resolution may be set to, for example, not larger than 4 nm and, in one example, may be set to 3.77 nm.

The spectroscopic component 21 is positioned between the detector 20 and the slit 80a. The spectroscopic component 21 is an optical component for splitting light coming into the housing 80 via the slit 80a into beams with different wavelengths. In the present embodiment, the spectroscopic component 21 splits the light from the slit 80a into beams with different wavelength in the horizontal direction HD. The spectroscopic component 21 may be a grating (diffraction grating), a prism, an optical filter (e.g., a linear variable filter), or a combination thereof, for example. In the present embodiment, the spectroscopic component 21 is a transparent grating.

The lens 22 is positioned between the detector 20 and the spectroscopic component 21. The lens 22 is a converging lens, for example. The lens 22 causes light from the spectroscopic component 21 to converge on the imaging plane 200 of the detector 20.

In the present embodiment, a position of the reflector 81 relative to the detector 20 is determined so that the reflector 81 occupies not a whole but part of a detection area of the detector 20. Thus, in the present embodiment, the detector 20 receives, at the imaging plane 200, first reflected light L2 being a reflection of light L1 from the light source 12 by the object 11 and second reflected light L3 being a reflection of light L1 from the light source 12 by the reflection surface 81a of the reflector 81. Accordingly, as shown in FIG. 13, the imaging plane 200 includes a first measuring area 200a to receive the first reflected light L2 being a reflection of light L1 from the light source 12 by the object 11, and a second measuring area 200b to receive the second reflected light L3 being a reflection of light L1 from the light source 11 by the reflector 81. Due to this configuration, the first reflected light L2 and the second reflected light L3 can be detected concurrently. Therefore, it is possible to measure a reflection spectrum of the first reflected light L2 and a reflection spectrum of the second reflected light L3 at one time. In FIG. 13, the vertical direction VD is a direction of a spatial axis corresponding to the upward or downward direction, and a line of the pixels 201 in the horizontal direction corresponds to a direction of a wavelength axis because the length direction of the slit 80a corresponds to the vertical direction VD and the width direction of the slit 80a corresponds to the horizontal direction HD. A luminance value of each pixel 201 corresponds to an intensity of a reflection spectrum. Therefore, based on a location and a pixel value of each pixel 201 within the first measuring area 200a, it is possible to obtain the reflection spectrum of the first reflected light L2 within the predetermined wavelength range. Based on a location and a pixel value of each pixel 201 within the second measuring area 200b, it is possible to obtain the reflection spectrum of the second reflected light L3 within the predetermined wavelength range.

Figure 14:
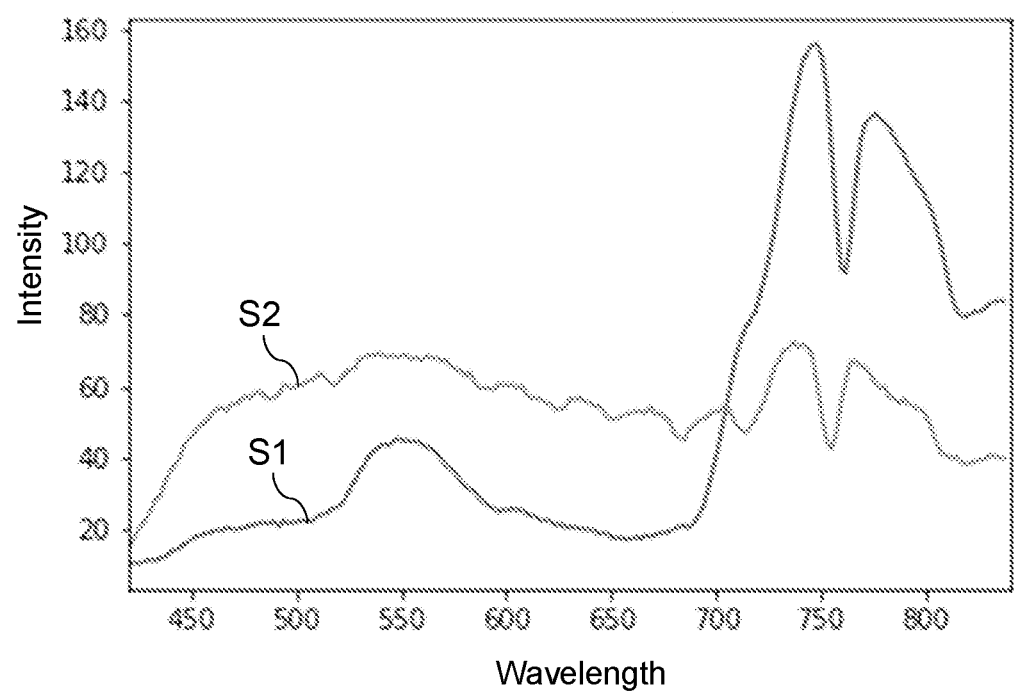
FIG. 14 is a graph showing reflection spectra obtained by the spectrometer of the spectroscopic measuring instrument of FIG. 1.
Figure 15:
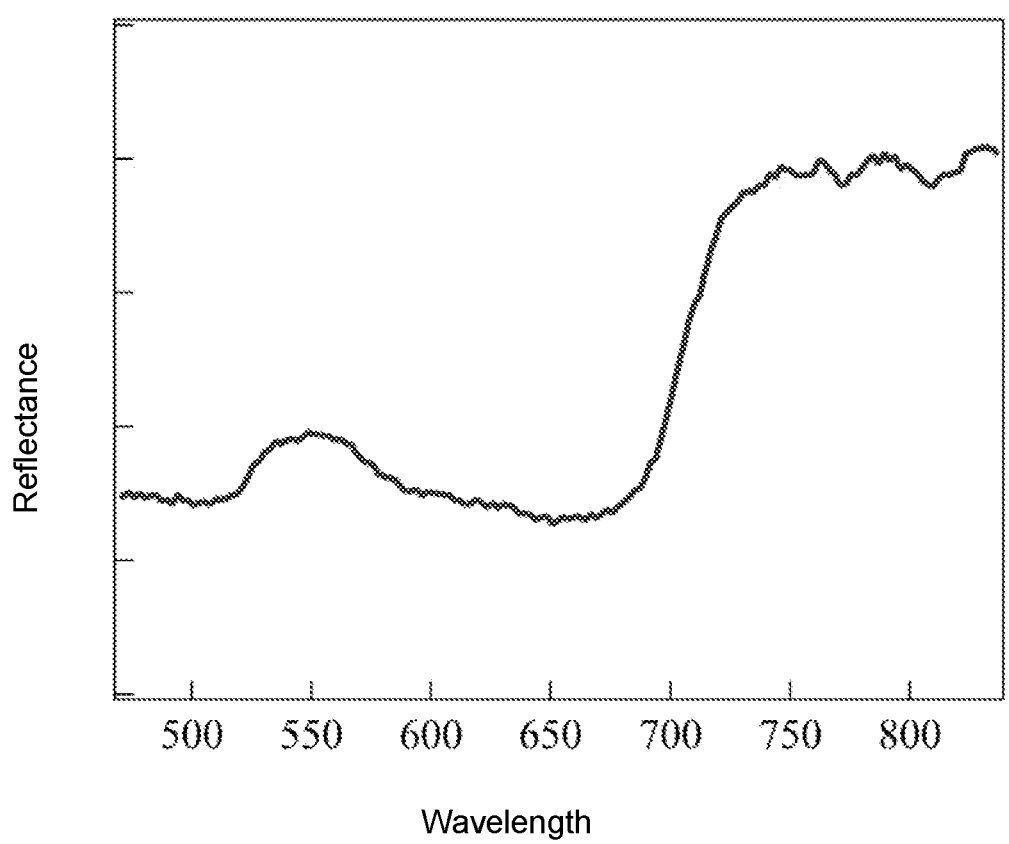
FIG. 15 is a graph of a reflection spectrum of an object corrected by use of a reflection spectrum of the light source.

FIG. 14 is a graph showing reflection spectra obtained by the spectrometer 2. In FIG. 14, a horizontal axis indicates a wavelength [nm] and a vertical axis indicates an intensity of light. In FIG. 14, S1 is a graph showing a reflection spectrum of the first reflected light L2, that is, the reflection spectrum of the object 11. S2 is a graph showing a reflection spectrum of the second reflected light L3, that is, the reflection spectrum of the light source 12. Regarding the spectroscopic measuring instrument 1, both the reflection spectrum of the object 11 and the reflection spectrum of the light source 12 can be obtained by the spectrometer 2. Therefore, the reflection spectrum of the object 11 can be corrected by using the reflection spectrum of the light source 12 as a standard. FIG. 15 is a graph of the reflection spectrum of the object 11 corrected by use of the reflection spectrum of the light source 12. In FIG. 15, a horizontal axis indicates a wavelength [nm] and a vertical axis indicates a reflectance. In the reflection spectrum of FIG. 15, influence of the reflection spectrum of the light source 12 is reduced and this enables comparison between the reflection spectra of the object 11 obtained by use of different light sources 12.

The measurement information D1 created by the spectrometer 2 includes information representing a result of the measurement of the reflection spectrum. In the present embodiment, the information representing the result of the measurement of the reflection spectrum includes information on the reflection spectrum of the first reflected light L2 and information on the reflection spectrum of the second reflected light L3 both. The information on the reflection spectrum of the first reflected light L2 is information on the reflection spectrum of the object 11. The information on the reflection spectrum of the second reflected light L3 is information on the reflection spectrum of the light source 12. The spectrometer 2 may include in the measurement information D1 the time when the measurement is performed, as metadata. In summary, the measurement information D1 may include the time when the measurement is performed, in addition to information on the result of the measurement.

The imaging device 3 is configured to record an image of the imaging area including the object surface 90 and output the image information D2 representing the image of the imaging area. The imaging device 3 includes an image sensor, an optical filter, and a processor, for example. Examples of the image sensor include a CMOS image sensor and a CCD image sensor. The optical filter is used to transmit light with visible light wavelength range to allow the image sensor to produce a visible image.

In FIG. 3, the imaging device 3 is positioned at a second end in the length direction (a left end in FIG. 5) of the object surface 90a of the shadow projector 9. A location and a direction, of the imaging device 3 are set to allow the imaging area of the imaging device 3 to include the object surface 90a. In the present embodiment, the imaging device 3 is supported by a supporting member 30 to allow the imaging area of the imaging device 3 to include the object surface 90a. In summary, an image obtained from the imaging device 3 shows the object surface 90a.

In the present embodiment, the location and the direction, of the imaging device 3 are set to allow the imaging area of the imaging device 3 to further include the first to third obstacles 91, 92 and 93. In summary, an image obtained from the imaging device 3 shows the first to third obstacles 91, 92 and 93. This means that the object surface 90a and the first to third obstacles 91 to 93 are shown in a single image. Thus, an image including an image of the object surface 90a and images of the first to third obstacles 91 to 93 can be obtained.

In the present embodiment, the location and the direction, of the imaging device 3 are set to allow the imaging area of the imaging device 3 to further include the object 11. In brief, an image obtained from the imaging device 3 shows the object 11. This means that the object surface 90a and the object 11 are shown in a single image. Thus, an image including an image of the object surface 90a and an image of the object 11 can be obtained.

The image information D2 created by the imaging device 3 includes the image of the imaging area and the imaging area includes the object surface 90a, the first to third obstacles 91, 92 and 93, and the object 11. The imaging device 3 may incorporate, in the image information D2, the time when the image of the imaging area is obtained, as metadata. In summary, the image information D2 may include the time when the image of the imaging area is obtained, in addition to information on the image of the imaging area.

The storage interface 4 enables removable connection of the computer readable medium 40 to the spectroscopic measuring instrument 1. The computer readable medium 40 is a non-transitory storage medium. The computer readable medium 40 is used to store information created by the spectroscopic measuring instrument 1, such as the measurement information D1 and the image information D2. One example of a combination of the computer readable medium 40 and the storage interface 4 may be a combination of a USB memory and a USB connector.

The I/O interface 5 functions as an input device for inputting information from users and an output device for outputting information to users. Thus, the I/O interface 5 is used for inputting information to the spectroscopic measuring instrument 1 and outputting information from the spectroscopic measuring instrument 1. The I/O interface 5 includes one or more human-machine interfaces. Examples of the human-machine interface may include: input devices such as mechanical switches, keyboards, pointing devices (e.g., mice, trackballs), touch pads, or microphones; output devices such as displays or loud speakers; and input output devices such as touch panels. In the present embodiment, the I/O interface 5 includes a display, a touch pad, and mechanical switches. The I/O interface 5 may be disposed at a rear surface of the housing 80, for example. The reason is to ensure operability of the I/O interface 5 by avoiding light L1 from the light source 12 from directly striking the I/O interface 5.

The processing device 6 is configured to control operation of the spectroscopic measuring instrument 1. The processing device 6 is connected to the spectrometer 2, the imaging device 3, the storage interface 4, and the I/O interface 5. The processing device 6 is accessible to computer readable medium 40 connected to the storage interface 4 through the storage interface 4. The processing device 6 may be realized by a computer system including one or more processors (microprocessors) and one or more memories, for example. The one or more processors run one or more programs (stored in the one or more memories) to realize predetermined functions. The one or more programs may be stored in the one or more memories in advance, but may be provided via electric telecommunications circuit such as the Internet or as being stored in a non-transitory storage medium such as memory cards. The processing device 6 may be configured by a single board computer, for example.

The processing device 6 is connected to the spectrometer 2, the imaging device 3 and the storage interface 4. Additionally, the processing device 6 is connected to the I/O interface 5.

The processing device 6 has a function of performing a measurement process. The processing device 6 may start the measurement process in response to predetermined operation to the I/O interface 5. The measurement process stores the measurement information D1 from the spectrometer 2 and the image information D2 from the imaging device 3, in the computer readable medium 40 connected to the storage interface 4. For example, the measurement process includes a first obtaining process, a second obtaining process and a storing process. The first obtaining process obtains the measurement information D1 from the spectrometer 2. In the first obtaining process, the processing device 6 outputs a control signal to the spectrometer 2 to obtain the measurement information D1 from the spectrometer 2, for example. The second obtaining process obtains the image information D2 from the imaging device 3. In the second obtaining process, the processing device 6 outputs a control signal to the imaging device 3 to obtain the image information D2 from the imaging device 3, for example. The storing process stores the measurement information D1 obtained by the first obtaining process and the image information D2 obtained by the second obtaining process, in the computer readable medium 40. In the storing process, the processing device 6 associates the measurement information D1 with the image information D2 time of which is the same as time of that measurement information D1. The time of the measurement information D1 may be time when the measurement is performed. The time of the image information D2 may be time when the image of the imaging area is obtained. The processing device 6 associates the measurement information D1 with the image information D2 time when the image of the imaging area is obtained of which is identical to the time when the measurement is performed. Herein, expression "time is the same as time" or "time is identical to time" should not be read in a strict sense but that expression includes a range considered "time is the same as time" or "time is identical to time". What extent of the range is considered "time is the same as time" or "time is identical to time" may be set appropriately based on time necessary for measurement. Note that, in the storing process, the processing device 6 may encrypt the measurement information D1 and the image information D2 and store them in the computer readable medium 40.

In the spectroscopic measuring instrument 1, by repeating performing the measurement process with changing the location of the spectroscopic measuring instrument 1 relative to at least one of the object 11 and the light source 12, the measurement can be performed with changing the measurement condition. This allows storing a set of the measurement information D1 and the image information D2 in the computer readable medium 40 for each measurement process.

The processing device 6 has a function of performing a displaying process. The processing device 6 may start the displaying process in response to predetermined operation to the I/O interface 5. The displaying process displays an image represented by the image information D2 from the imaging device 3 by means of the I/O interface 5. This allows a user to check what image can be taken by the spectroscopic measuring instrument 1.

[1.2 Procedure of Adding Entry to Database]

Figure 16:
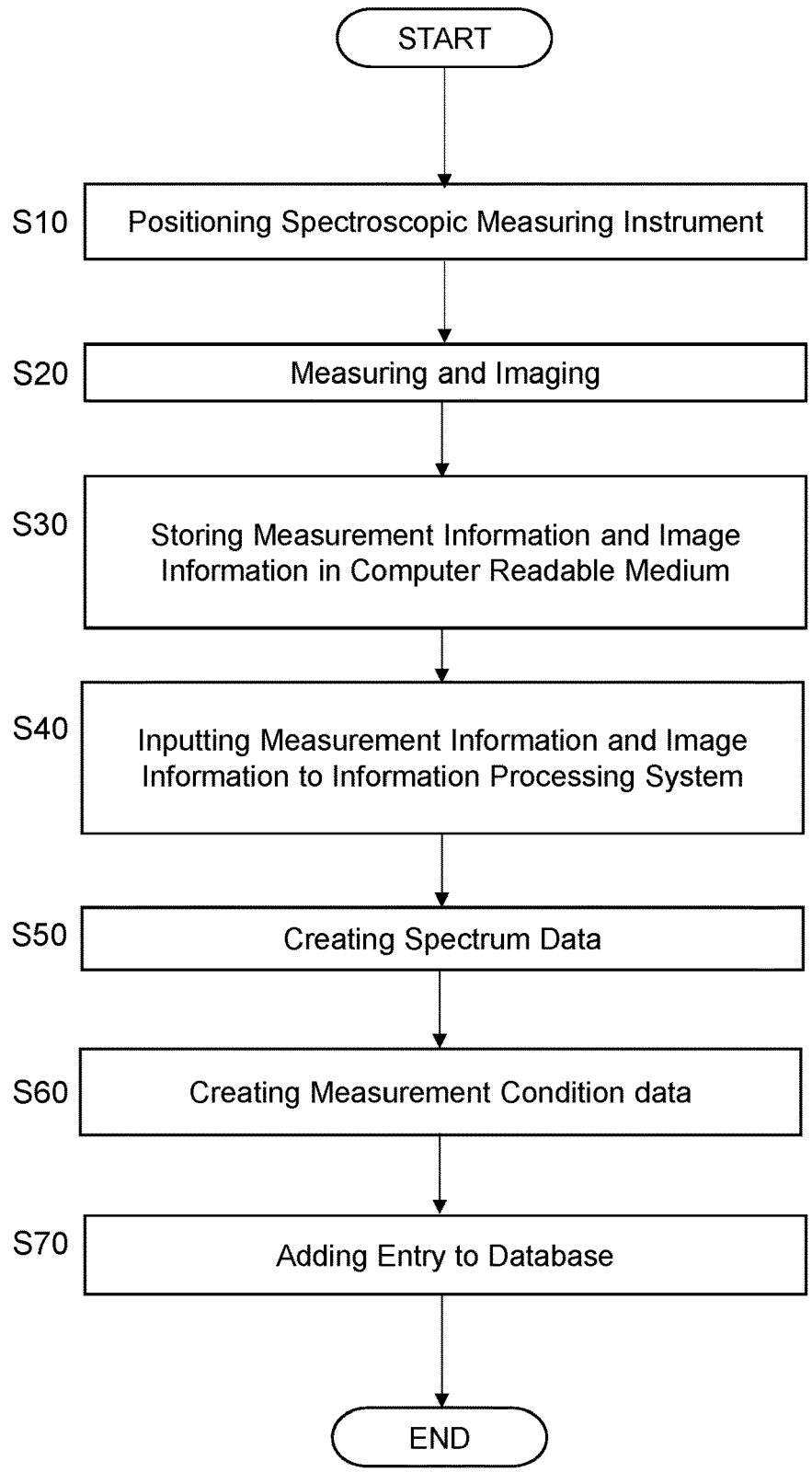
FIG. 16 is a flowchart of a procedure of adding an entry to a database.

Next, a procedure of adding an entry to the database DB1 are described with reference to FIG. 16. FIG. 16 is a flowchart of the procedures of adding an entry to the database DB1.

First, the spectroscopic measuring instrument 1 is disposed at a desired location with a desired direction (S10). In measuring the reflection spectrum of the object 11 by the spectroscopic measuring instrument 1, the location and the direction, of the spectroscopic measuring instrument 1 are determined to align the left or right direction of the object surface 90a with the horizontal direction in the actual space. In aligning the left or right direction of the object surface 90a with the horizontal direction in the actual space, the first obstacle 91 and the second obstacle 92 may be used. This is an operation of setting a roll angle of the spectroscopic measuring instrument 1 to zero. By aligning the left or right direction of the object surface 90a with the horizontal direction in the actual space, identification of the positional relationship between the light source 12 and the spectrometer 2 can be facilitated.

Next, the reflection spectrum is measured by the spectrometer 2 and the image of the imaging area is recorded by the imaging device 3 (S20). For example, performing the predetermined operation by use of the I/O interface 5 of the spectroscopic measuring instrument 1 allows the processing device 6 to start the measurement process and then perform the first obtaining process of obtaining the measurement information D1 from the spectrometer 2 and the second obtaining process of obtaining the image information D2 from the imaging device 3.

Subsequently, the processing device 6 performs the storing process (S30). The storing process stores the measurement information D1 obtained by the first obtaining process and the image information D2 obtained by the second obtaining process, in the computer readable medium 40. At this process, the measurement information D1 is associated with the image information D2 time of which is the same as time of that measurement information D1.

Accordingly, the measurement information D1 and the image information D2 are stored in the computer readable medium 40 connected to the spectroscopic measuring instrument 1. The measurement information D1 and the image information D2 obtained by the spectroscopic measuring instrument 1 are input to the information processing system 100 by way of the computer readable medium 40 (S40).

In the information processing system 100, the server device 120 creates the spectrum data based on the measurement information D1 (S50). In more detail, the server device 120 creates the spectrum data by using the measurement information D1 together with the image information D2. The measurement information D1 includes the information on the result of the measurement of the reflection spectrum. In the present embodiment, the information on the result of the measurement of the reflection spectrum includes the information on the reflection spectrum of the first reflected light L2 and the information on the reflection spectrum of the second reflected light L3 both. The information on the reflection spectrum of the first reflected light L2 is the information on the reflection spectrum of the object 11. The information on the reflection spectrum of the second reflected light L3 is the information on the reflection spectrum of the light source 12. The server device 120 therefore extracts data on the reflection spectrum of the object 11 and data on the reflection spectrum of the light source 12 from the measurement information D1. The image information D2 includes the image of the imaging area and the imaging area includes the object surface 90a, the first to third obstacles 91, 92 and 93, and the object 11. The image of the imaging area therefore includes the image relating to the object 11, the image of the object surface 90a and the first to third obstacles 91, 92 and 93. The image of the object surface 90a and the first to third obstacles 91, 92 and 93 relates to one or more shadows cast on the object surface 90a by the light L1 from the light source 12 and is therefore considered the image relating to the light source 12. The server device 120 extracts, from the image information D2, the image relating to the object 11 and the image relating to the light source 12, as the data relating to the image. The server device 120 uses the data on the reflection spectrum of the object 11 and the data on the spectrum of the light source 12 extracted from the measurement information D1 together with the data relating to the image extracted from the image information D2 to create the spectrum data.

The server device 120 creates the measurement condition data based on the image information D2 (S60). As mentioned above, the image information D2 includes the image of the object surface 90a. The server device 120 identifies the positional relationship between the light source 12 and the spectrometer 2 at the measurement, from the one or more shadows 91a, 92a, 931a, 932a and 933a of the one or more obstacles 91, 92 and 93 cast on the object surface 90a by the light L1 from the light source 12 which are shown in the image of the imaging area represented by the image information D2. The positional relationship between the light source 12 and the spectrometer 2 at the measurement is represented by the azimuth difference (Az) between the light source 12 and the spectroscopic measuring instrument 1, the angle (θ1) of the spectroscopic measuring instrument 1 relative to the object 11, and the angle (θ2) of the light source 12 relative to the object 11, for example. In addition, the server device 120 determines the assessment value of the spread of the light source 12, from the one or more shadows 91a, 92a, 931a, 932a and 933a of the one or more obstacles 91, 92 and 93 cast on the object surface 90a by the light L1 from the light source 12 which are shown in the image of the imaging area represented by the image information D2. As described above, the server device 120 executes image processing based on the image information D2 to determine the azimuth difference (Az) between the light source 12 and the spectroscopic measuring instrument 1, the angle (θ1) of the spectroscopic measuring instrument 1 relative to the object 11, the angle (θ2) of the light source 12 relative to the object 11, and the assessment value of the spread of the light source 12. With this configuration, the server device 120 creates the measurement condition data based on the image information D2.

For each set of the measurement information D1 and the image information D2, the server device 120 creates an entry by creating the spectrum data and the measurement condition data based on the measurement information D1 and the image information D2, and adds the entry created, to the database DB1 of the database device 110 (S70).

In the flowchart of FIG. 16, although creating spectrum data (S50) and creating measurement condition data (S60) are performed in this order, the order of these may not be limited. Creating measurement condition data (S60) may be performed prior to, or in parallel to creating spectrum data (S50).

[1.3 Advantageous Effects]

The aforementioned spectroscopic measuring instrument 1 can provide the measurement information D1 representing the result of the measurement of the reflection spectrum, by the spectrometer 2. Further, the spectroscopic measuring instrument 1 includes the shadow projector 9 which causes the light L1 from the light source 12 to cast shadow(s), records the image of the shadow(s) cast by the shadow projector 9 by the imaging device 3, and can provide the recorded image as the image information D2. Analyzing geometries of shadows cast by the shadow projector 9, such as positions or shapes, based on the image information D2 enables direct identification of the positional relationship between the light source 12 and the spectrometer 2 at the measurement, such as, a direction of the spectrometer 2 relative to the light source 12 (a field of view direction of the spectrometer 2).

The positional relationship between the light source 12 and the spectrometer 2 at the measurement can also be identified by use of an azimuth sensor or an elevation-angle sensor. However, influence caused by an error inherent to the azimuth sensor or the elevation-angle sensor is inevitable. For example, in some azimuth sensors, errors of azimuth angles measured by such azimuth sensors may exceeds ±10°. When the error in the azimuth angle exceeds ±10°, the reflection spectrum measured at the actual azimuth angle of 10° and the reflection spectrum measured at the actual azimuth angle of 20° may be recorded as the reflection spectra measured at the interchanged azimuth angles or the same azimuth angle. In some cases, the order of the reflection spectra based on the azimuth angle measured by the azimuth sensor may be different from the order of the reflection spectra based on the actual azimuth angle. Apparently, the reflection spectrum seems to fluctuate for the azimuth angle. The image information D2 provided by the spectroscopic measuring instrument 1 allows analyzation of locations or shapes of shadows cast by the shadow projector 9 to thereby enable direct identification of the positional relationship between the light source 12 and the spectrometer 2 at the measurement. According to the spectroscopic measuring instrument 1, an error between the actual angle and the angle obtained by the spectroscopic measuring instrument 1 can be more reduced than in the case of using the azimuth sensors and the elevation angle sensors. The spectroscopic measuring instrument 1 therefore can improve accuracy of identification of the positional relationship between the light source 12 and the spectrometer 2 at the measurement. The spectroscopic measuring instrument 1 does not require electronic devices such as azimuth sensors or elevation angle sensors, and it is therefore possible to reduce the production cost.

In addition, using the image information D2 enables determining, from the clarity of the shadow cast by the shadow projector 9, the spread of the light source 12, such as the degree of scattering of light from the light source 12 caused by the surrounding environment of the object 11. It is therefore possible to perform a process for reducing influences on the reflection spectrum of the object 11 caused by the degree of scattering of light from the light source 12 due to the surrounding environment of the object 11.

As described above, the spectroscopic measuring instrument 1 can provide the image information D2 in addition to the measurement information D1. The image information D2 enables identification of the measurement condition at the time when the result of the measurement represented by the measurement information D1 is obtained. Thus the spectroscopic measuring instrument 1 enables assessment of the result of the measurement in consideration of the measurement condition. To sum up, according to the spectroscopic measuring instrument 1, it is possible to reduce influences which would be caused by the surrounding environment of the object 11 such as weather, luminance of the light source 12 (the reflection spectrum of the light source 12), and the positional relationship between the light source 12 and the spectrometer 2. Consequently, the reflection spectrum of the object 11 can be measured stably with high accuracy.

The measurement using the spectroscopic measuring instrument 1 is expected to be performed multiple times with changing a position of at least one of the spectroscopic measuring instrument 1 and the light source 12 relative to the object 11. Thus a large amount of the measurement information D1 and a large amount of the image information D2 are created. As described above, the spectroscopic measuring instrument 1 stores the measurement information D1 and the image information D2 in the computer readable medium 40 which is removable. If there are a large amount of the measurement information D1 and a large amount of the image information D2 and thus a large amount of data is required to transfer the measurement information D1 and the image information D2 from the spectroscopic measuring instrument 1 to the server device 120, using the removable computer readable medium 40 do not suffer from delay of wireless communication or failure in wireless communication differently from using wireless communication and data therefore can be transferred safely and successfully. The spectroscopic measuring instrument 1 does not need communication interfaces for wireless communication and settings for such wireless communication. This can result in a decrease in the production cost.

2. Variations

Embodiments of the present disclosure are not limited to the above embodiment. The above embodiment can be modified according to design requirements or the like as long as it achieve the problem to be solved by the present disclosure. The following is a non-limitative list of variations relating to the above embodiment. One or more of the variations described below would be applied in combination of another or others.

In one variation, the spectroscopic measuring instrument 1 may not include the level 95. If the level 95 is equipped, persons may align the X direction of the object surface 90a with the horizontal direction by using their sense. When persons align the left or right direction (X direction) of the object surface 90a with the horizontal direction by using their sense, they may use the first obstacle 91 or the second obstacle 92. This allows more accurate alignment of the X direction of the object surface 90a with the horizontal direction than in the case where persons align the X direction of the object surface 90a with the horizontal direction by using their sense.

In one variation, the spectrometer 2 may not necessarily include the time when the measurement is performed, in the measurement information D3 as metadata. For example, the processing device 6 can use a clock circuit to identify time of obtaining the measurement information D1 and use it as the time when the measurement is performed. The spectrometer 2 may include a location where the measurement is performed, in the measurement information D3 as metadata. In other words, the measurement information D3 may include information on a location where the measurement is performed, in addition to the information on the result of the measurement. The spectrometer 2 as such may not be limited to a corresponding configuration in the above embodiment. The spectrometer 2 may have a well-known configuration.

In one variation, the imaging device 3 may not necessarily include the time when the image of the imaging area is obtained, in the image information D2 as metadata. For example, the processing device 6 can use a clock circuit to identify time of obtaining the image information D2 and use it as the time when the image of the imaging area is obtained. The imaging device 3 may include a location where the image of the imaging area is obtained, in the image information D2 as metadata. In other words, the image information D2 may include information on a location where the image of the imaging area is obtained, in addition to the information on the image of the imaging area. The imaging device 3 as such may not be limited to a corresponding configuration in the above embodiment. The imaging device 3 may have a well-known configuration.

In one variation, the storage interface 4 may not be limited particularly. The storage interface 4 may be any device allowing the processing device 6 to access the computer readable medium 40. The computer readable medium 40 may be a memory other than USB memories. Examples of the computer readable medium 40 may include an optical disk such as CD-ROM, DVD, and a magnetic disk.

In one variation, the I/O interface 5 may not be limited particularly. The spectroscopic measuring instrument 1 may be configured to allow the processing device 6 to perform the measurement process by remote control using remote controllers. In this case, the I/O interface 5 is optional.

In one variation, the processing device 6 may not be limited particularly. The processing device 6 may be configured to perform the measurement process in response to remote control by a remote controller or the like. The processing device 6 may not be limited to a single board computer but may be constituted by one or more other computer systems.

In one variation, the casing 7 is not limited particularly. For example, a positional relationship between the body 8 and the shadow projector 9 may be different from that in the above embodiment. The casing 7 does not necessarily have is its weight and size to be able to be easily carried or moved. It is sufficient that the casing 7 can be disposed in any of different positions relative to the object 11 and the light source 12 by using a moving device. Examples of the moving device may include a gimbal or a rail which is fixed at a predetermined position and moves the spectroscopic measuring instrument 1 relative to the object 11, and a mobile object such as a vehicle, a drone, or an artificial satellite which carries the spectroscopic measuring instrument 1.

The body 8 may not be limited to a corresponding configuration in the above embodiment. In the body 8, the housing 80 may not have a shape of accommodating the spectrometer 2, the storage interface 4, the I/O interface 5 and the processing device 6, collectively. The housing 80 may have a shape accommodating at least the spectrometer 2 entirely. The holder 82 holding the reflector 81 may be removably attached to the housing 80. The holder 82 may be attached to be movable between a position where the reflector 81 faces the slit 80a of the housing 80 and a position where the reflector 81 does not face the slit 80a of the housing 80. The spectrometer 2 may be configured to output first measurement information including information on the reflection spectrum of the first reflected light L2 and second measurement information including information on the reflection spectrum of the second reflected light L3 separately as the measurement information D1. The reflector 81 and the holder 82 are optional.

The shadow projector 9 may not be limited to a corresponding configuration in the above embodiment. The object surface 90a need not be white but may have a color which can distinguish shadow(s) on the object surface 90a. The first to third obstacles 91 to 93 are mere examples of obstacles for casting shadows on the object surface 90a. The number of obstacles, shapes of obstacles and arrangement of obstacles may not be limited particularly as long as they enables determination of the azimuth difference between the light source 12 and the spectroscopic measuring instrument 1 and the angle of the light source 12 relative to the object surface 90a. The number of obstacles, shapes of obstacles and arrangement of obstacles may preferably be set to cast shadows on the object surface 90a irrespective of where the light source 12 is positioned relative to the spectroscopic measuring instrument 1. However, in some cases, it is allowed that shadows are not cast on the object surface 90a when the light source 12 is in a certain position. Desirably, in view of reduction of processing load, the number of obstacles, shapes of obstacles and arrangement of obstacles may be set to facilitate determination of the azimuth difference between the light source 12 and the spectroscopic measuring instrument 1 and the angle of the light source 12 relative to the object surface 90a. However, it is not necessary to facilitate determination of the azimuth difference between the light source 12 and the spectroscopic measuring instrument 1 and the angle of the light source 12 relative to the object surface 90a. It is sufficient that obstacles contribute to display information on the location of the light source 12 to the object surface 90a. Such obstacles is not necessarily opaque but may transmit some of rays of the light L1 of the light source 12.

3. Aspects

As apparent from the above embodiment and variations, the present disclosure includes the following aspects. In the following, reference signs in parenthesis are attached only for indicating a correspondence relation with the embodiment. Note that, to avoid reduction in readability, second or subsequent time of attachment of reference signs in parenthesis may be omitted.

A first aspect is a spectroscopic measuring instrument (1) including: a spectrometer (2) configured to make measurement of a reflection spectrum of an object (11) relative to a light source (12) and output measurement information (D1) representing a result of the measurement; a shadow projector (9) including an object surface (90a) to receive light (L1) from the light source (12) and one or more obstacles (91, 92, 93) to allow light (L1) from the light source (12) to cast one or more shadows (91a, 92a, 931a, 932a, 933a) on the object surface (90a); an imaging device (3) configured to record an image of an imaging area including the object surface (90a) and output image information (D2) representing the image of the imaging area; a storage interface (4) removably connectable to a computer readable medium (40); and a processing device (6) connected to the spectrometer (2), the imaging device (3) and the storage interface (4), and configured to perform a measurement process of storing the measurement information (D1) from the spectrometer (2) and the image information (D2) from the imaging device (3) in the computer readable medium (40) connected to the storage interface (4). The aspect enables measurement of the reflection spectrum of the object (11) relative to the light source (12) and identification of the positional relationship between the light source (12) and the spectrometer (2) at the measurement.

A second aspect is the spectroscopic measuring instrument (1) based on the first aspect. In the second aspect, the imaging area includes at least one of the one or more obstacles (91, 92, 93). This aspect can facilitate comparison between a shadow cast on the object surface (90a) by the obstacle (91, 92, 93) and the obstacle (91, 92, 93).

A third aspect is the spectroscopic measuring instrument (1) based on the first or second aspect. In the third aspect, the one or more obstacles (91, 92, 93) include a vertical bar (first obstacle 91) extending in a direction perpendicular to the object surface (90a). This aspect allows using the vertical bar (first obstacle 91) as a reference for aligning the left or right direction of the object surface (90a) with the horizontal direction and therefore the positioning of the spectroscopic measuring instrument (1) can be facilitated.

A fourth aspect is the spectroscopic measuring instrument (1) based on the third aspect. In the fourth aspect, the vertical bar (first obstacle 91) is positioned to serve as an indicator for a direction of the spectrometer (2). This aspect allows using the vertical bar (first obstacle 91) as a reference for determining the direction of the spectrometer (2) and therefore the positioning of the spectroscopic measuring instrument (1) can be facilitated.

A fifth aspect is the spectroscopic measuring instrument (1) based on any one of the first to fourth aspects. In the fifth aspect, the one or more obstacles (91, 92, 93) include a horizontal bar (second obstacle 92) extending in a left or right direction of the object surface (90a). This aspect allows using the horizontal bar (second obstacle 92) as a reference for aligning the left or right direction of the object surface (90a) with the horizontal direction and therefore the positioning of the spectroscopic measuring instrument (1) can be facilitated.

A sixth aspect is the spectroscopic measuring instrument (1) based on any one of the first to fifth aspects. In the sixth aspect, the one or more obstacles (91, 92, 93) include a wall (third obstacle 93) defining at least part of an outer periphery of the object surface (90a). This aspect allows using the wall (third obstacle 93) for delimiting the extent of the object surface (90a).

A seventh aspect is the spectroscopic measuring instrument (1) based on any one of the first to sixth aspects. In the seventh aspect, the imaging area includes the object (11). This aspect can obtain the image of the object surface (90a) and the image of the object (11) at one time by the imaging device (3).

An eighth aspect is the spectroscopic measuring instrument (1) based on any one of the first to seventh aspects. In the eighth aspect, the processing device (6) is configured to associate the measurement information (D1) with the image information (D2) time of which is the same as time of that measurement information (D1). This aspect enables correct association between the measurement information (D1) and the image information (D2).

A ninth aspect is the spectroscopic measuring instrument (1) based on any one of the first to eighth aspects. In the ninth aspect, the spectroscopic measuring instrument (1) further includes a reflector (81) for reflecting light (L1) from the light source (2) to allow the spectrometer (2) to receive the light (L1). This aspect enables measurement of the reflection spectrum of the light source (12).

A tenth aspect is the spectroscopic measuring instrument (1) based on the ninth aspect. In the tenth aspect, the spectrometer (2) includes a detector (20) including an imaging plane (200). The imaging plane (200) includes a first measuring area (200a) to receive first reflected light (L2) being a reflection of light (L1) from the light source (12) by the object (11), and a second measuring area (200b) to receive second reflected light (L3) being a reflection of light (L1) from the light source (12) by the reflector (81). This aspect can measure the reflection spectrum of the object (11) and the reflection spectrum of the light source (12) both at one time.

An eleventh aspect is the spectroscopic measuring instrument (1) based on the tenth aspect. In the eleventh aspect, the imaging plane (200) includes a plurality of pixels (201) arranged in a vertical direction (VD) and a horizontal direction (HD). The spectrometer (2) includes a spectroscopic component (21) between the imaging plane (200) and a slit (80a). The slit (80a) is in front of the imaging plane (200) and extends in the vertical direction (VD). The spectroscopic component (21) splits light (L1) from the slit (80a) into beams with different wavelengths in the horizontal direction (HD). The first measuring area (200a) and the second measuring area (200b) are arranged in the vertical direction (VD). This aspect can measure the reflection spectrum of the object (11) and the reflection spectrum of the light source (12) both at one time.

A twelfth aspect is the spectroscopic measuring instrument (1) based on any one of the first to eleventh aspects. In the twelfth aspect, the spectroscopic measuring instrument (1) further includes a level (95) for aligning a left or right direction of the object surface (90a) with a horizontal direction. This aspect can improve accuracy of the positioning of the spectroscopic measuring instrument (1).

A thirteenth aspect is a spectroscopic measuring instrument (1) for providing information to be processed by an information processing system (100). The spectroscopic measuring instrument (1) includes: a spectrometer (2) configured to make measurement of a reflection spectrum of an object (11) relative to a light source (12) and output measurement information (D1) representing a result of the measurement; a shadow projector (9) including an object surface (90a) to receive light (L1) from the light source (12) and one or more obstacles (91, 92, 93) to allow light (L1) from the light source (12) to cast one or more shadows (91a, 92a, 931a, 932a, 933a) on the object surface (90a); an imaging device (3) configured to record an image of an imaging area including the object surface (90a) and output image information (D2) representing the image of the imaging area; a storage interface (4) removably connectable to a computer readable medium (40); and a processing device (6) connected to the spectrometer (2), the imaging device (3) and the storage interface (4), and configured to perform a measurement process of storing the measurement information (D1) from the spectrometer (2) and the image information (D2) from the imaging device (3) in the computer readable medium (40) connected to the storage interface (4). The information processing system (100) is configured to: obtain the measurement information (D1) and the image information (D2) by way of the computer readable medium (40); and identify a positional relationship between the light source (12) and the spectrometer (2) at the measurement based on one or more shadows (91a, 92a, 931a, 932a, 933a)

of the one or more obstacles (91, 92, 93) cast by light (L1) from the light source (12) on the object surface (90*a*) present in the image of the imaging area represented by the image information (D2). The aspect enables measurement of the reflection spectrum of the object (11) relative to the light source (12) and identification of the positional relationship between the light source (12) and the spectrometer (2) at the measurement.

A fourteenth aspect is the spectroscopic measuring instrument (1) based on the thirteenth aspect. In the fourteenth aspect, the information processing system (100) is configured to determine an assessment value of spread of the light source (12) at the measurement based on one or more shadows (91*a*, 92*a*, 931*a*, 932*a*, 933*a*) of the one or more obstacles (91, 92, 93) cast by light (L1) from the light source (12) on the object surface (90*a*) present in the image of the imaging area represented by the image information (D2). This aspect can obtain the assessment value of the spread of the light source (12) at the measurement and therefore can improve accuracy of the assessment of the reflection spectrum of the object (11).

Any of the above second to twelfth aspects would be applied in combination with the thirteenth or fourteenth aspect. The above second to twelfth aspects each are optional.

The present disclosure can apply to spectroscopic measuring instruments. In particular, the present disclosure can apply to a spectroscopic measuring instrument for measuring a reflection spectrum of an object in relation to a light source.

What is claimed is:

1. A spectroscopic measuring instrument comprising:
   a spectrometer configured to make measurement of a reflection spectrum of an object relative to a light source and output measurement information representing a result of the measurement;
   a shadow projector comprising an object surface to receive light from the light source and one or more obstacles to allow light from the light source to cast one or more shadows on the object surface;
   an imaging device comprising an image sensor and configured to record an image of an imaging area including the object surface and output image information representing the image of the imaging area;
   a storage interface removably connectable to a computer readable medium; and
   a processing device comprising a computer system connected to the spectrometer, the imaging device and the storage interface, and configured to perform a measurement process of storing the measurement information from the spectrometer and the image information from the imaging device in the computer readable medium connected to the storage interface.

2. A spectroscopic measuring instrument of claim 1, wherein
   the imaging area includes at least one of the one or more obstacles.

3. A spectroscopic measuring instrument of claim 1, wherein
   the one or more obstacles include a vertical bar extending in a direction perpendicular to the object surface.

4. A spectroscopic measuring instrument of claim 3, wherein
   the vertical bar is positioned to serve as an indicator for a direction of the spectrometer.

5. A spectroscopic measuring instrument of claim 1, wherein
   the one or more obstacles include a horizontal bar extending in a left or right direction of the object surface.

6. A spectroscopic measuring instrument of claim 1, wherein
   the one or more obstacles include a wall defining at least part of an outer periphery of the object surface.

7. A spectroscopic measuring instrument of claim 1, wherein
   the imaging area includes the object.

8. A spectroscopic measuring instrument of claim 1, wherein
   the processing device is configured to associate the measurement information with the image information time of which is the same as time of that measurement information.

9. A spectroscopic measuring instrument of claim 1, further comprising
   a reflector for reflecting light from the light source to allow the spectrometer to receive the light.

10. A spectroscopic measuring instrument of claim 9, wherein:
    the spectrometer includes a detector including an imaging plane; and
    the imaging plane includes a first measuring area to receive first reflected light being a reflection of light from the light source by the object, and a second measuring area to receive second reflected light being a reflection of light from the light source by the reflector.

11. A spectroscopic measuring instrument of claim 10, wherein:
    the imaging plane includes a plurality of pixels arranged in a vertical direction and a horizontal direction;
    the spectrometer includes a spectroscopic component between the imaging plane and a slit, the slit being in front of the imaging plane and extending in the vertical direction, and the spectroscopic component splitting light from the slit into beams with different wavelengths in the horizontal direction; and
    the first measuring area and the second measuring area are arranged in the vertical direction.

12. A spectroscopic measuring instrument of claim 1, further comprising
    a level for aligning a left or right direction of the object surface with a horizontal direction.

13. A spectroscopic measuring instrument for providing information to be processed by an information processing system,
    the spectroscopic measuring instrument comprising:
    a spectrometer configured to make measurement of a reflection spectrum of an object relative to a light source and output measurement information representing a result of the measurement;
    a shadow projector comprising an object surface to receive light from the light source and one or more obstacles to allow light from the light source to cast one or more shadows on the object surface;
    an imaging device comprising an image sensor and configured to record an image of an imaging area including the object surface and output image information representing the image of the imaging area;
    a storage interface removably connectable to a computer readable medium; and
    a processing device comprising a first computer system connected to the spectrometer, the imaging device and the storage interface, and configured to perform a measurement process of storing the measurement information from the spectrometer and the image information from the imaging device in the computer readable medium connected to the storage interface, and the information processing system comprising a second computer system and being configured to:
  obtain the measurement information and the image information by way of the computer readable medium; and
  identify a positional relationship between the light source and the spectrometer at the measurement based on one or more shadows of the one or more obstacles cast by light from the light source on the object surface present in the image of the imaging area represented by the image information.

14. A spectroscopic measuring instrument of claim 13, wherein
  the information processing system is configured to determine an assessment value of spread of the light source at the measurement based on one or more shadows of the one or more obstacles cast by light from the light source on the object surface present in the image of the imaging area represented by the image information.

15. A spectroscopic measuring instrument of claim 13, wherein
  the imaging area includes at least one of the one or more obstacles.

16. A spectroscopic measuring instrument of claim 13, wherein
  the one or more obstacles include a vertical bar extending in a direction perpendicular to the object surface.

17. A spectroscopic measuring instrument of claim 16, wherein
  the vertical bar is positioned to serve as an indicator for a direction of the spectrometer.

18. A spectroscopic measuring instrument of claim 13, wherein
  the one or more obstacles include a horizontal bar extending in a left or right direction of the object surface.

19. A spectroscopic measuring instrument of claim 13, wherein
  the one or more obstacles include a wall defining at least part of an outer periphery of the object surface.

20. A spectroscopic measuring instrument of claim 13, wherein
  the imaging area includes the object.

* * * * *